(12) United States Patent
Caplan et al.

(10) Patent No.: US 8,958,666 B2
(45) Date of Patent: Feb. 17, 2015

(54) METHODS OF ACHIEVING OPTIMAL COMMUNICATIONS PERFORMANCE

(75) Inventors: David O. Caplan, Billerica, MA (US); Walid A. Atia, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 2084 days.

(21) Appl. No.: 11/649,337

(22) Filed: Jan. 3, 2007

(65) Prior Publication Data

US 2008/0019705 A1 Jan. 24, 2008

Related U.S. Application Data

(62) Division of application No. 10/097,187, filed on Mar. 13, 2002, now Pat. No. 7,181,097.

(60) Provisional application No. 60/276,003, filed on Mar. 15, 2001.

(51) Int. Cl.
| | |
|---|---|
| *G02B 6/12* | (2006.01) |
| *H04B 10/2513* | (2013.01) |
| *H04B 10/50* | (2013.01) |
| *H04B 10/508* | (2013.01) |
| *G02B 6/36* | (2006.01) |

(52) U.S. Cl.
CPC ........ *H04B 10/25137* (2013.01); *H04B 10/505* (2013.01); *H04B 10/5051* (2013.01); *H04B 10/508* (2013.01)
USPC .............................................. 385/14; 385/88

(58) Field of Classification Search
None
See application file for complete search history.

(56) References Cited

U.S. PATENT DOCUMENTS

| | | |
|---|---|---|
| 4,941,738 A | 7/1990 | Olsson |
| 5,038,359 A | 8/1991 | Pepper et al. |
| 5,191,627 A | 3/1993 | Haas et al. |
| 5,263,037 A | 11/1993 | Trutna, Jr. et al. |
| 5,268,787 A | 12/1993 | McIntyre |
| 5,295,016 A | 3/1994 | Van Deventer |
| 5,303,314 A | 4/1994 | Duling, III et al. |
| 5,311,603 A | 5/1994 | Fidric |

(Continued)

OTHER PUBLICATIONS

Caplan, D.O., et al., "A Quantum-limited optically-matched communication link," Optical Society of America, 2000.*

(Continued)

*Primary Examiner* — Rhonda Peace
(74) *Attorney, Agent, or Firm* — Hamilton, Brook, Smith & Reynolds, P.C.

(57) ABSTRACT

A system includes an optical transmitter that outputs an optical signal having a substantially Gaussian waveform and an optical receiver that is optically coupled to the optical transmitter and has an impulse response essentially matching the waveform. The impulse response and waveform preferably match in the time domain. The transmitter and receiver may be average-power-limited, using, for example, an erbium-doped fiber amplifier. To achieve a high signal-to-noise ratio, the waveform may be designed to minimize jitter, sample duration, matching parasitics, and inter-symbol interference (ISI). Such a waveform may be a return-to-zero (RZ) Gaussian or Gaussian-like waveform and may be transmitted in a variety of modulation formats. Further, the system may be used in WDM or TDM systems. A method for characterizing the time domain impulse response of an optical element used in the optical receiver is provided, where the method is optionally optimized using deconvolution and/or cross-correlation techniques.

25 Claims, 22 Drawing Sheets

(56) References Cited

U.S. PATENT DOCUMENTS

| | | | |
|---|---|---|---|
| 5,396,657 A * | 3/1995 | Jokinen | 455/307 |
| 5,448,579 A | 9/1995 | Chang et al. | |
| 5,574,739 A | 11/1996 | Carruthers et al. | |
| 5,601,083 A | 2/1997 | Anderson | |
| 5,689,595 A | 11/1997 | Pan | |
| 5,734,667 A | 3/1998 | Esman et al. | |
| 5,880,877 A | 3/1999 | Fermann et al. | |
| 6,104,528 A | 8/2000 | Hwang | |
| 6,164,540 A * | 12/2000 | Bridgelall et al. | 235/462.01 |
| 6,195,200 B1 | 2/2001 | DeMarco et al. | |
| 6,256,130 B1 * | 7/2001 | Bulow | 398/141 |
| 6,384,966 B1 | 5/2002 | Dymott | |
| 6,529,270 B1 * | 3/2003 | Bills | 356/237.2 |
| 6,879,640 B1 * | 4/2005 | Agazzi | 375/295 |
| 2001/0024307 A1 * | 9/2001 | Franco et al. | 359/161 |
| 2002/0063923 A1 * | 5/2002 | Coppeta et al. | 359/124 |
| 2002/0146066 A1 * | 10/2002 | Eldar et al. | 375/152 |

OTHER PUBLICATIONS

Garcia-Zambrana, A. et al., "RZ-Gaussian pulses reduce the receiver complexity in wireless infrared links at high bit rates," Electronic Letters, Jun. 24, 1999, vol. 35, No. 13, pp. 1059-1061.*

Garcia-Zambrana, Antonio, et al., "Performance Analysis of Improved Pulse-Position Modulation in Infrared Links," IEEE, 1999, pp. 2413-2417.*

Shingo Kawai, hiroji Masuda, Ken-Ichi Suzuki, Kazuo Aida, NTT *Optical network Systems Laboratories*, 1-1 Hikari-no-oka, Yokosuka, Kanagawa, 239 Japan.

A. K. Srivastava, "Wide bandwidth high capacity systems", OFC/IOOC '99, v. 4, p. 59-60, Feb. 1999.

S. Kinoshita, "Advances in optical fiber amplifiers for WDM systems", APCC/OECC '99, v. 2, p. 1333-1334, Oct. 1999.

A. E. Willner, "SNR analysis of crosstalk and filtering effects in an amplified multichannel direct-detection dense-WDM system", IEEE Photonics Technology Letters, p. 186-189, v. 4, Feb. 1992.

H. L. Van Trees, in Detection, Estimation, and Modulation Theory, pp. 1-15, 224-271, Part 1, Wiley, New York 1968.

A. Hasegawa, Y. Kodama, and A. Maruta, "Recent progress in dispersion-managed soliton transmission technologies", Optical Fiber Technology 3, 197-213, 1997.

S. B. Alexander, in "Optical Communication Receiver Design," pp. 273-283, 292-310, SPIE Optical Engineering Press, Bellingham, Washington, USA, 1997.

E. Desurvire, in Erbium Doped Fiber Amplifiers, pp. 155-187, John Wiley & Sons, New York, 1994.

S. Shapiro, in Ultrashort Light Pulses, Picosecond Techniques and Applications, pp. 83-122, Springer Verlag, NY, 1977.

B. P. Nelson and N. J. Doran, "Optical Sampling Oscilloscope Using Nonlinear Fibre Loop Mirror", Electronic Letters, p. 204-205, v. 27, No. 3, Jan. 31, 1991.

N. S. Patel et. al, "Optical Rate Conversion for High-Speed TDM Networks", IEEE Photonics Technology Letters, p. 1277-1279, v. 9, No. 9, Sep. 1997.

U. Wagemann, "Photonic All-parameter Analyzer", product note, Agilent Technologies, 2001.

R. Trebino, et. al., "Measuring ultrashort laser pulses in the time-frequency domain using frequency-resolved optical gating", Rev. Sci. Instrum. 68 (9), Sep. 1997, pp. 3277-3295.

M. Kuznetsov and D. O. Caplan, "Time-frequency analysis of optical communication signals and the effects of second and third order dispersion", CLEO, May 2000.

F. Koyama and K. Iga, "Frequency Chirping in External Modulators", IEEE Journal of Lightwave Technology, v. 6, No. 1, Jan. 1988.

Caplan, D.O., Quantum-Limited Optical Communications, Division Seminar: QL Comm, Group 67—Optical Comm. Tech., Mar. 27, 2001.

Caplan, D.O., et al., "A high-power high-gain single-polarization EDFA", *Lasers and Electro-Optics, 2000 (Cleo 2000)*, CWJ3, pp. 283-284, May 7-12, 2000, ISBN 1-55752-634-6. (Abstract attached).

Caplan, D.O., et al., "High-Sensitivity variable-rate transmit/receive architecture", *IEEE LEOS '99*, TuU 0003, 1999, pp. 297-298.

Duling, I.N., III, et al., "Single-Polarisation Fibre Amplifier," *Elec. Let.*, 28(12): 1126-1128 (1992).

Glassner, David S., et al., "Spatial hole burning in erbium fiber lasers using Faraday rotator mirrors," *OFC '97 Technical Digest*, paper TuN3, pp. 66-67.

Hakimi, F. et al., :High-power single-polarization EDFA with wavelength multiplexed pumps, CLEO '98, CWK1, 1998, pp. 287-288.

Tashiro, Y. et al., "high-power erbium-doped fiber amplifier pumped by wavelength multiplexed semiconductor laser diode unit," *Optical Fiber Communication, OFC '97* Conference in 1997, pp. 107-108.

P.C. Becker et al., Erbium-Doped Fiber Amplifiers Fundamentals and Technology, Academic Press, San Diego, CA 1997.

P. S. Henry, "Error-rate performance of optical amplifiers," In Proc. OFC'89, Houston, TX, Feb. 1989.

J. C. Livas, "High sensitivity optically preamplified 10 Gb/s receivers", Proceedings of the Optical Fiber Communication Conference 1996, post deadline paper PD4, 1996.

P. A. Humblet, "Design of optical matched filters", Globecom '91.

H. Geiger, M. Ibsen, R. I. Laming, "Optimum receivers with fiber gratings", OFC 1998.

P. A. Humblet and M. Azizoglu, "On bit error rate of lightwave systems with optical amplifiers", Journal of Lightwave Technology, vol. 9, No. 11, Nov. 1991.

M. L. Stevens, D. M. Boroson, D. O. Caplan, "A Novel Variable-rate Pulse-position Modulation System with Near Quantum Limited Performance", LEOS, Nov. 1999.

S. R. Chinn, D. M. Boroson, J. C. Livas, "Sensitivity of optically preamplified DPSK receivers with Fabry-Perot filters", Journal of Lightwave Technology, vol. 14, No. 3, Mar. 1996.

W. A. Atia and R. S. Bondurant, "Demonstration of return-to-zero signaling in both OOK and DPSK formats to improve receiver sensitivity in an optically preamplified receiver", LEOS, Nov. 1999.

* cited by examiner

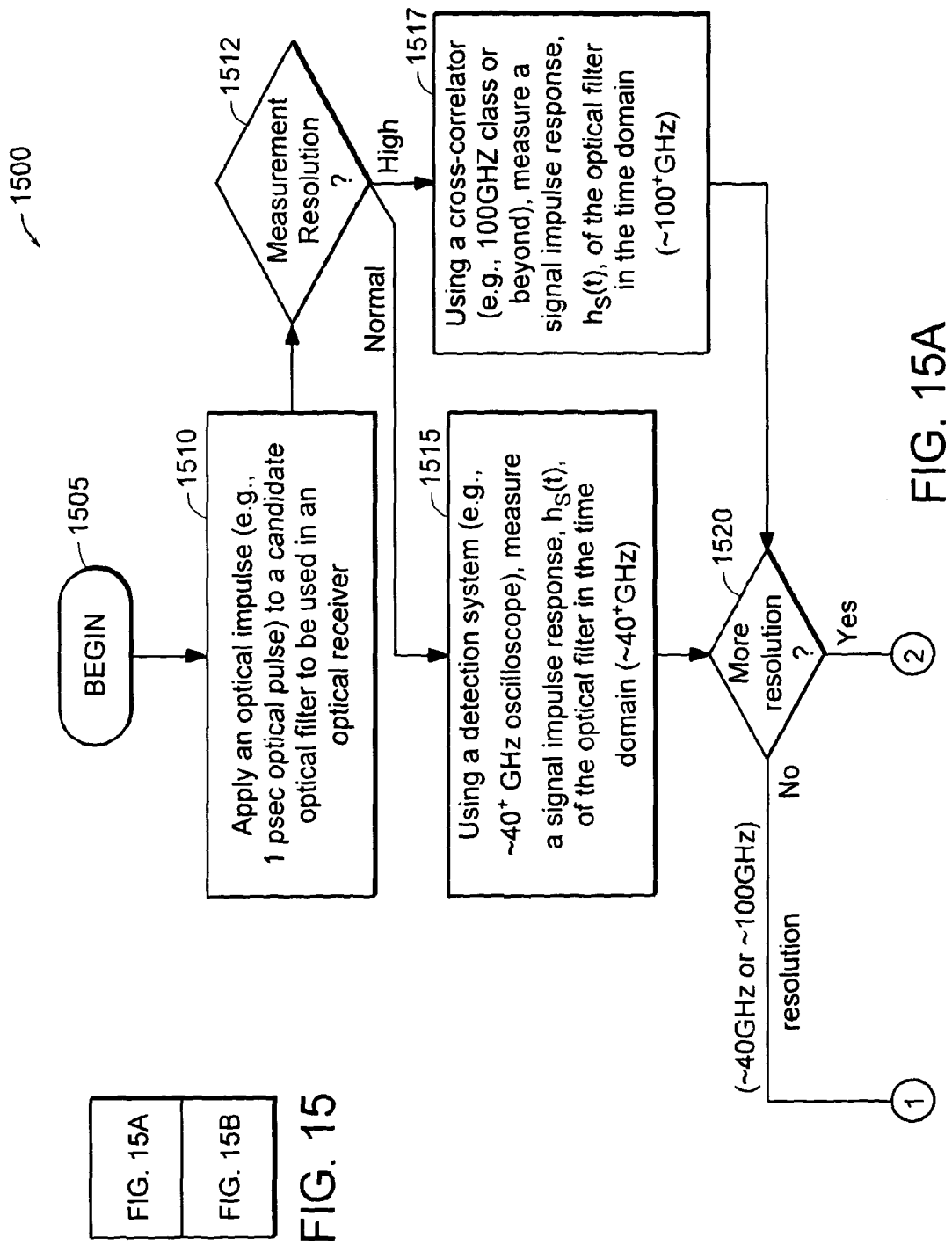

METHODS OF ACHIEVING OPTIMAL COMMUNICATIONS PERFORMANCE

RELATED APPLICATIONS

This application is a divisional of U.S. application Ser. No. 10/097,187, filed Mar. 13, 2002 now U.S. Pat. No. 7,181,097, which claims the benefit of U.S. Provisional Application No. 60/276,003, filed on Mar. 15, 2001; the entire teachings of the above application are incorporated herein by reference.

GOVERNMENT SUPPORT

The invention was supported, in whole or in part, by a grant F19628-00-C-002 from United States Air Force. The Government has certain rights in the invention.

BACKGROUND OF THE INVENTION

High sensitivity optical communication links are vital for the design of future high-performance communication networks. FIG. 1 provides an example of such a network. This network includes satellite nodes 105 having free-space optical transmission channels 110. The network 100 also includes ground-based network nodes 115, such as central offices. Between the ground-based network nodes 115 are fiber optic or free space transmission channels 120. Both the satellite nodes 105 and ground-based nodes 115 include transmitters and receivers (not shown).

It is well known that for good sensitivity, optical filters in the receivers need to be matched to the transmitted waveform. See H. L. Van Trees, *Detection, Estimation and Modulation Theory, Part* 1, pp. 1-15, 224-271, Wiley, New York 1968 and P. S. Henry, "Error-Rate Performance of Optical Amplifiers," in Proc. OFC '89, Houston, Tex., February 1989. Sensitive receiver performance reduces transmitter or mid-span amplifier requirements, extends link distances, and provides additional margin. See J. C. Livas, "High Sensitivity Optically Preamplified 10 Gb/s Receivers," Proceedings of the Optical Fiber Communication Conference 1996, post deadline paper PD 4, 1996 and D. O. Caplan, M. L. Stevens, D. M Boroson, J. E. Kaufmann, "A Multi-Rate Optical Communications Architecture with High Sensitivity," LEOS, November 1999. This is especially beneficial for free space communications since improvements in receiver sensitivity directly reduce transmitted power requirements.

Given the trend towards ultra-high speed 100 Gbps class all-optical networks, the need for all-optical filtering becomes more apparent as network elements increasingly surpass the capabilities of electronics. Therefore, processing in the optical domain becomes essential.

High sensitivity optical receivers are ultimately limited by shot noise that arises due to the variance in photon arrival times. The best performance that can be obtained in an optical communication link occurs when the shot or quantum noise is the dominant noise source. This is known as the quantum limit. For binary intensity modulation (IM) formats, such as on-off-keying (OOK) and binary pulse position modulation (PPM), using optically preamplified receivers, the quantum limited performance at $10^{-9}$ bits error rate (BER) corresponds to approximately 40 photons/bit or approximately −43 dBm (−50 nW) at 10 Gbps.

FIG. 2A is a schematic diagram of an optically preamplified on-off-keying (OOK) receiver 205. The receiver 205 includes an optical amplifier 206a, optical bandpass filter 206b, PIN-Diode photodetector 206c, electrical lowpass filter 206d, and decision circuitry 206e (collectively, stages 206). These stages 206 are typical of optical receivers.

Between each of the stages in the receiver 205 is a set of corresponding spectral diagrams 210 graphically representing optical or electrical spectral densities of signals processed by the corresponding components in the receiver 205. A spectrum 211a of a received optical signal is received by the optical amplifier 206a. A spectrum 211b of the amplified optical signal is outputted by the optical amplifier 206a and filtered by the optical bandpass filter 206b. A spectrum 211c of the filtered, amplified, optical signal is converted to an electrical frequency spectrum 211d by the PIN-photodiode photodetector 206c. The electrical frequency spectrum 211d is filtered by the lowpass filter 206d, producing a spectrum 211e that is processed by the decision circuitry 206e.

FIG. 2B is a digital waveform 215 that graphically represents the resulting digital signal received by the decision circuitry, where the resulting digital signal includes noise (e.g., amplified spontaneous emission, ASE) superimposed on true and false logic levels of the digital waveform 215.

The following equations approximately describe the noise riding on the digital waveform 215.

Received signal current: $Is=GehPs/hn$

Received ASE current: $Isp=ehP_{ASE}/hn=ehn_{sp}(G-1)Bo$

Received noise variance:

$N_{shot}=2e(Is+Isp)Be$ $N_{signal \times ASE}=4GIsIspBe/Bo$ $N_{ASE \times ASE}=Isp^2 Be(2Bo-Be)/Bo^2$ $N_{Tot}=N_{shot}+N_{signal \times ASE}+N_{ASE \times ASE}$ $SNR=(GehPs/hn)/(SQRT(N_{Tot}(\text{``}1\text{''}))+(SQRT(N_{TOT}(\text{``}0\text{''}))))$ $BER \sim Q[SNR] \sim e(\exp(-Q^2/2))/(SQRT(2p)Q) \sim \frac{1}{2}e^{-SNR/2}$ $Bo=2Be, G \gg 1, n_{sp}=1,$ Receiver Sensitivity@$BER=10^{-9} => N=40$ photons/bit Thus, at a bit error rate (BER) of $10^{-9}$, the theoretical sensitivity of the receiver 205 is 40 photons/bit. Detailed analysis with comparable results can be found in E. Desurvire, in Erbium Doped Fiber Amplifiers, pp. 155-187, John Wiley & Sons, N.Y., 1994 and S. B. Alexander, in Optical Communication Receiver Design, pp. 273-283, 292-310, SPIE Optical Engineering Press, Bellingham, Wash., USA, 1997.

High sensitivity quantum-limited optical receivers are particularly useful in free-space communications since they directly reduce the transmitter power required to close the link. Some examples include ship-to-shore communications and inter-building links that are sensitive to weather conditions, satellite cross-links, and deep space communications where distances/link budget can change significantly.

At high bit rates, optical preamplified receivers are the most sensitive receivers to date and in widespread use throughout the telecommunications industry.

As indicated by Shannon's Theorem, the capacity of a channel is a function of the bandwidth available and the signal-to-noise ratio (SNR). Shannon's Theorem (1949) says that, "error-free communications are possible up to rate C bits per second (bps) over a channel of bandwidth B (Hz) at a given signal-to-noise ratio (SNR)," and is expressed as: $C=B \log_2(1+SNR)$. Shannon's Theorem motivated development of digital communications systems, including work at MIT Lincoln Laboratory from the early 1950's to the present.

Extensive efforts have been made throughout the telecommunications industry to expand the available capacity of optical networks—primarily by increasing the channel bandwidth (e.g., "S", "C", "L" bands, Raman amplifiers, etc.), as discussed in S. Kawai, H. Masuda, K. Suzuki, K. Aida, "Ultrawide, 75 nm 3 dB gain-band optical amplifier utilizing erbium-doped fluoride fiber and Raman fiber", OFC '98., p. 32-33, February 1998; A. K. Srivastava, "Wide bandwidth high capacity systems", OFC/IOOC '99, v. 4, p. 59-60, February 1999; S. Kinoshita, "Advances in optical fiber amplifiers for WDM systems", APCC/OECC '99, v. 2, p. 1333-1334, October 1999; and A. E. Willner, "SNR analysis of crosstalk and filtering effects in an amplified multichannel direct-detection dense-WDM system", IEEE Photonics Technology Letters, p: 186-189, v. 4, February 1992.

Alternatively, the channel capacity can also be increased by improving the SNR. Matched optical receivers maximize signal-to-noise ratio (SNR).

SUMMARY OF THE INVENTION

While the concept of matched optical filtering in communications applications has been discussed previously (see P. A. Humblet, "Design of Optical Matched Filters," Globecom '91 and H. Geiger, M. Ibsen, R. I. Laming, "Optimum Receivers with Fiber Gratings," OFC 1998), a system employing the principles of the present invention goes well beyond the performances of the earlier teachings by having demonstrated nearly matched receiver sensitivities of 43 photons-per-bit (PPB) at a $10^{-9}$ bit error-rate (BER) by carefully matching the optical signaling waveform to the receiver filter. These results (i.e., 43 photons-per-bit) fall less than 0.5 dB from quantum limited theory (discussed in P. A. Humblet and M. Azizoglu, "On Bit Error Rate of Lightwave Systems with Optical Amplifiers," Journal of Lightwave Technology, Vol. 9, no. 11, November 1991) and represent a 2-3 dB improvement over the best previously reported optically preamplified on-off-keying (OOK) receiver sensitivities, the best of which was 2.2 dB from quantum limited theory (see J. C. Livas, "High Sensitivity Optically Preamplified 10 GB/s receivers," Proceedings of the Optical Fiber Communication Conference 1996, post deadline paper PD 4 1996; M. L. Stevens, D. M. Boroson, D. O. Caplan, "A Novel Variable-Rate Pulse-Position Modulation System with Near Quantum Limited Performance," LEOS, November 1999; S. R. Chinn, D. M. Boroson, J. C. Livas, "Sensitivity of Optically Preamplified DPSK Receivers with Fabry-Perot Filters," Journal of Lightwave Technology, Vol. 14, no. 3, March 1996; and W. A. Atia and R. S. Bondurant, "Demonstration of Return-to-Zero Signaling in both OOK and DPSK Formats to Improve Receiver Sensitivity in an Optically Preamplified Receiver," LEOS, November 1999).

While bandwidth expansion efforts in optical amplifiers and fibers have progressed rapidly (see S. Kawai, H. Masuda, K. Suzuki, K. Aida, "Ultrawide, 75 nm 3 dB gain-band optical amplifier utilizing erbium-doped fluoride fiber and Raman fiber", OFC '98., p. 32-33, February 1998; A. K. Srivastava, "Wide bandwidth high capacity systems", OFC/IOOC '99, v. 4, p. 59-60, February 1999; and S. Kinoshita, "Advances in optical fiber amplifiers for WDM systems", APCC/OECC '99, v. 2, p. 1333-1334, October 1999), there have been relatively few developments in deployed technologies that address the SNR side of the capacity equation of Shannon's Theory. See P. S. Henry, "Error-Rate Performance of Optical Amplifiers," in Proc. OFC '89, Houston, Tex., February 1989; J. C. Livas, "High Sensitivity Optically Preamplified 10 Gb/s receivers," Proceedings of the Optical Fiber Communication Conference 1996, post deadline paper PD 4, 1996; and D. O. Caplan, M. L. Stevens, D. M. Boroson, J. E. Kaufmann, "A Multi-Rate Optical Communications Architecture with High Sensitivity," LEOS, November 1999. The present invention addresses the SNR side of the capacity equation and provides recent advances for uses in, for example, high-sensitivity matched optical communication links that could play an important role in the design of future high-performance optical networks.

Matched communication links can be used to reduce the need for high-performance wide-band electronics and to optimize optical networks in terms of power and bandwidth efficiency as well as overall system performance, potentially enabling increased channel density and net throughput. Improved matching leads to better received SNR. Applying this allows the same communication performance with reduced transmitted power. This, in turn, can reduce the effect of deleterious non-linearities, which can ultimately limit overall system capacity.

Accordingly, one aspect of the present invention includes a system for providing optical communications. The system includes an optical transmitter that outputs an optical signal having a substantially Gaussian waveform. The system also includes an optical receiver that is optically coupled to the optical transmitter and has an impulse response essentially matching the waveform. The optical receiver receives the optical signal.

The matching relationship is:

$$H_{sig}(f) = H^*_{filter}(f) \text{ in the frequency domain, which is equivalent to}$$

$$h_{sig}(t) = h_{filter}(-t) \text{ in the time domain,}$$

$$= h_{filter}(t) \text{ if the time domain waveform is symmetric.}$$

This is the case for a Gaussian pulse; therefore, the impulse response and waveform preferably match in the time domain. The transmitter and receiver may be average-power-limited. In such an embodiment, the transmitter and receiver may include an erbium-doped fiber amplifier.

In one embodiment, the transmitter optically modulates a continuous wave laser. In such a case, the modulation may apply both pulses and data to the continuous wave laser. To apply the modulation, the transmitter includes at least one modulator, which could be included within the source as in direct modulation (e.g., laser diode modulation current) or could be applied externally using modulators, such as Mach-Zehnder, electro-absorption, and electro-reflection modulators. The transmitter and receiver may operate at varying rates.

In practice, to achieve a high SNR, the given waveform is designed to minimize jitter, sample duration, and matching parasitics, such as achieved by a Gaussian or Gaussian-like pulse. The given waveform may also be chosen to minimize inter-symbol interference (ISI). For example, such a waveform may be a low duty-cycle return-to-zero (RZ) waveform. The matching of the impulse response of the optical receiver and the transmitted waveform may be designed to maximize the overall communication performance without necessarily increasing manufacturing tolerances.

The system has shown a sensitivity of about 43 photons-per-bit at a $10^{-9}$ bit-error rate (BER), which corresponds to about 0.5 dB from quantum limited theory. In one embodiment, the average signal received is less than about 2.2 dB from the quantum limited performance (i.e., theory) of an ideal, optically preamplified, on-off-keying waveform.

The system may transmit and receive the optical signal across a free-space channel or a guided channel, such as a fiber. Further, the system may be used in WDM or TDM systems.

Another aspect of the present invention includes an optical receiver having an optical filter with a time domain impulse response essentially equivalent to a time domain waveform of the optical signal to be filtered. The optical receiver may include detection electronics optically coupled to the optical filter to convert the optical signal to a corresponding electrical signal.

The optical receiver may also include an optical preamplifier (i) receiving the optical signal and (ii) providing an amplified optical signal to the optical filter. Such a preamplifier may be an average-power-limited preamplifier, such as an erbium-doped fiber amplifier.

The receiver may receive optical signals composed of essentially Gaussian or Gaussian-like return-to-zero (RZ) waveforms.

In one embodiment, the time domain impulse response of the optical filter is measured by a measurement system in which a deconvolution technique is employed to remove impulse response related effects of the measurement system. The measurement of the time domain impulse response of the optical filter may further be improved by an application of cross-correlation techniques to increase measurement resolution.

Yet another aspect of the present invention includes a method for assembling an optical receiver. The method includes selecting an optical filter having a time domain impulse response essentially equivalent to a time domain waveform, which is more or less symmetric, of the optical signal to be filtered. The method may also include coupling the optical filter to detection electronics used to convert the optical signal to a corresponding electrical signal.

Yet another aspect of the present invention includes a method and apparatus for characterizing an optical element. An optical pulse generator provides an optical pulse that is essentially a delta function. A measurement system (i) measures an impulse response of the optical element to the optical pulse and (ii) measures the optical pulse directly. A processor calculates the impulse response of the optical element by using a deconvolution technique to deconvolve the measured impulse response of the optical element with the impulse response of the measurement system. The optical element is characterized by the calculated impulse response.

The deconvolution approach expands the bandwidth of the measurement system by about a factor of two when using a wide bandwidth direct detection system, such as a photodetector and oscilloscope, which yields measurement bandwidths of ~40+ GHz. The processor may also perform cross-correlation techniques to increase measurement resolution of the impulse responses to beyond ~50 GHz, which is the current state of the art for direct detection systems. Using deconvolution and cross-correlation, the method and apparatus can achieve less than about 10 psec time resolution and extend the bandwidth of the measurement capacity to at least about 100 GHz.

The impulse response of the optical element is a field impulse response and may be calculated using the following equation:

$h_s(t) = IFT(H_m(f)/H_d(f)) = IFT((FT(h_m(t))/FT(h_d(t)))$, where FT is a Fourier Transform operation, IFT is an Inverse Fourier Transform operation, $H_d(f)$ is a frequency domain representation of the time domain detection system field impulse response, $h_d(t)$, and $H_m(f)$ is a frequency domain representation of the time domain measured field response, $h_m(t)$, in which the field response, $h(t)$, is approximately proportional to the square root of the measured intensity response, $I(t)$.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
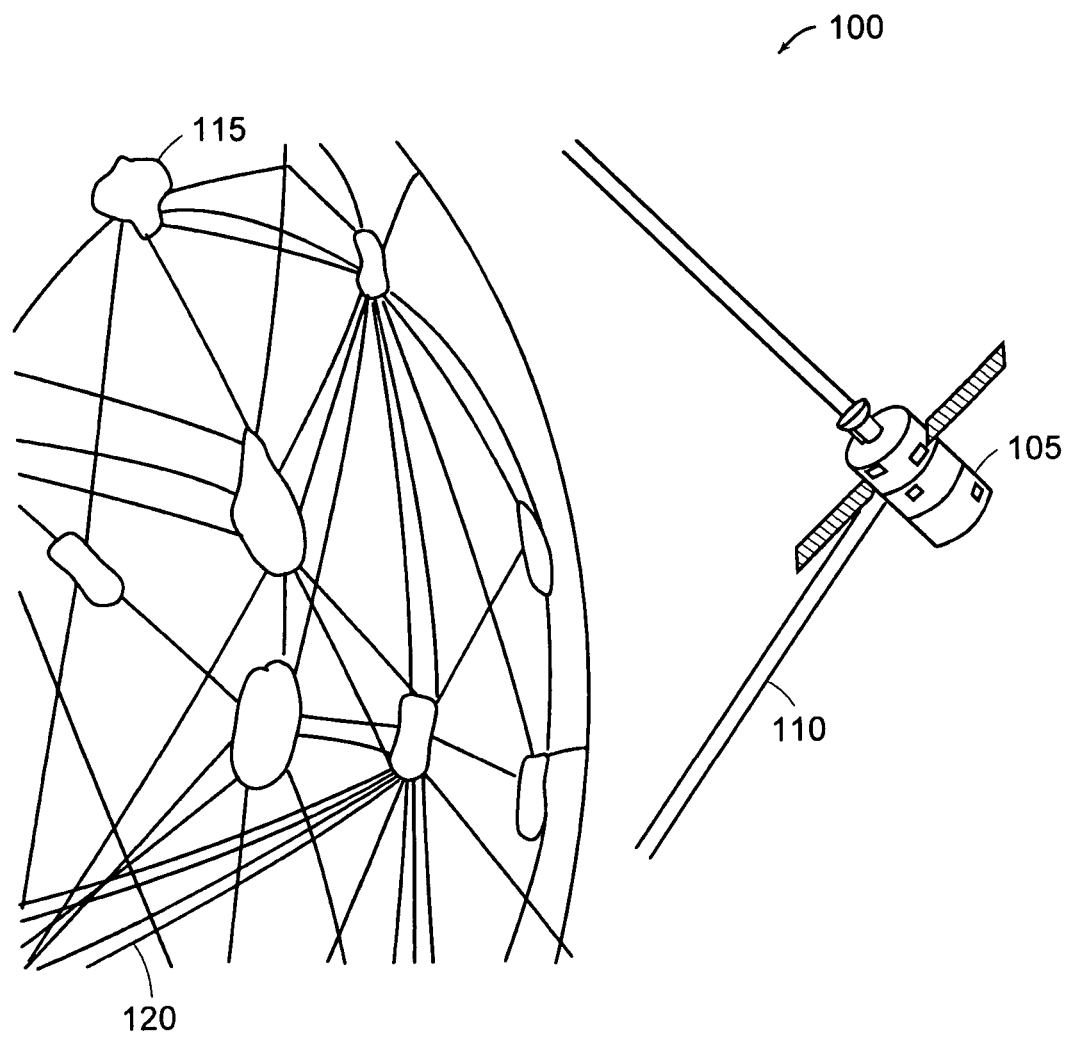
FIG. 1 is a prior art optical network using both free space and fiber optic communication links.
Figure 2A:
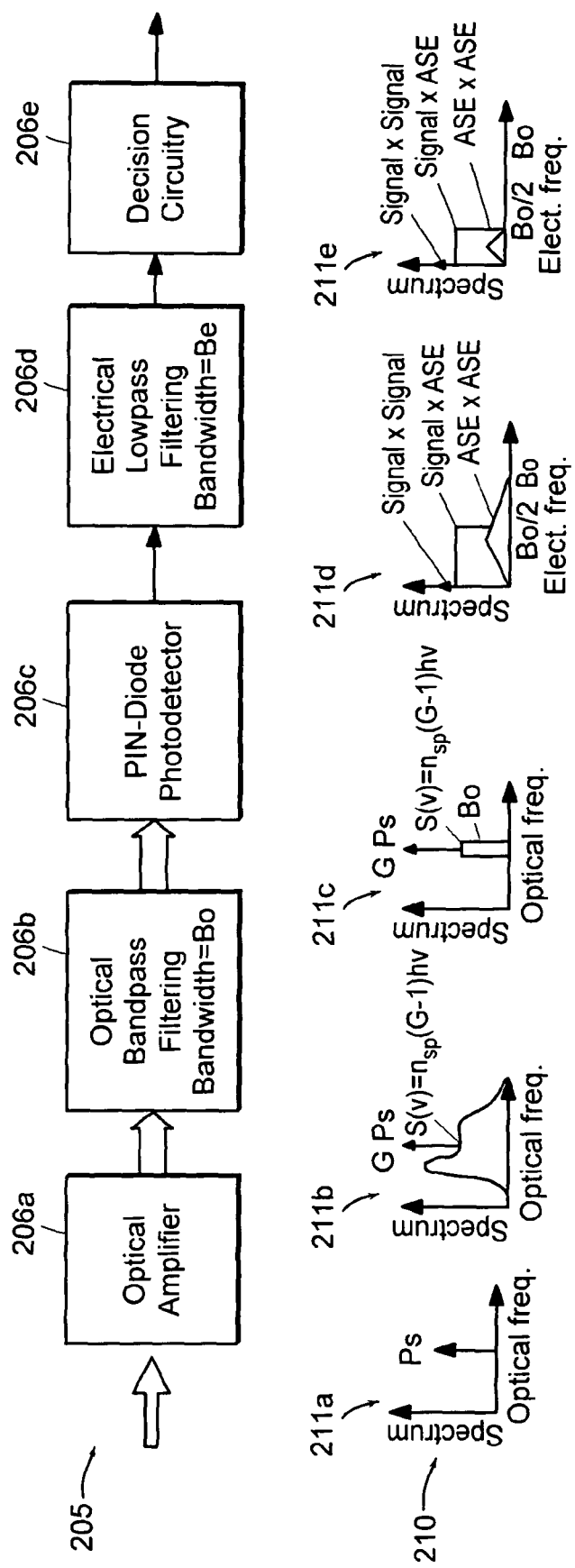
FIG. 2A is a schematic diagram of a prior art optically preamplified on-off-keying (OOK) receiver that may be deployed in the optical network of FIG. 1.
Figure 2B:
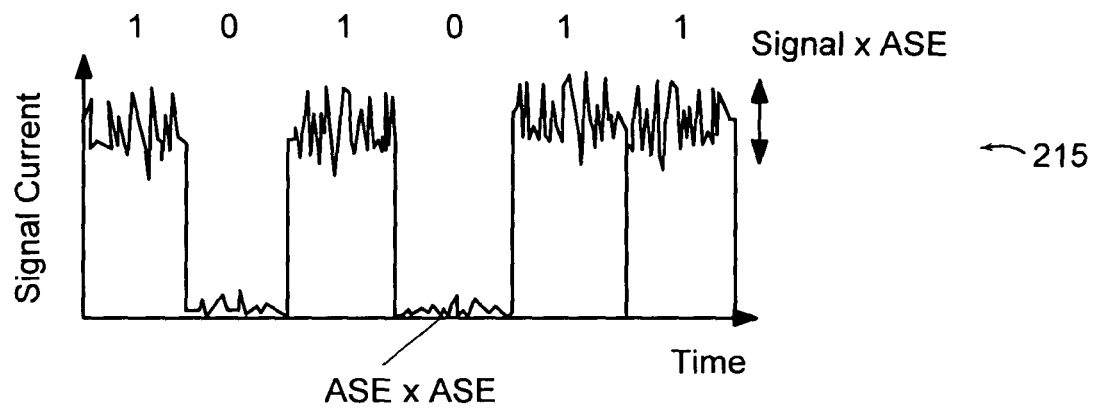
FIG. 2B is a digital waveform that graphically represents a resulting digital signal received by the receiver of FIG. 2A.
Figures 1, 3A:
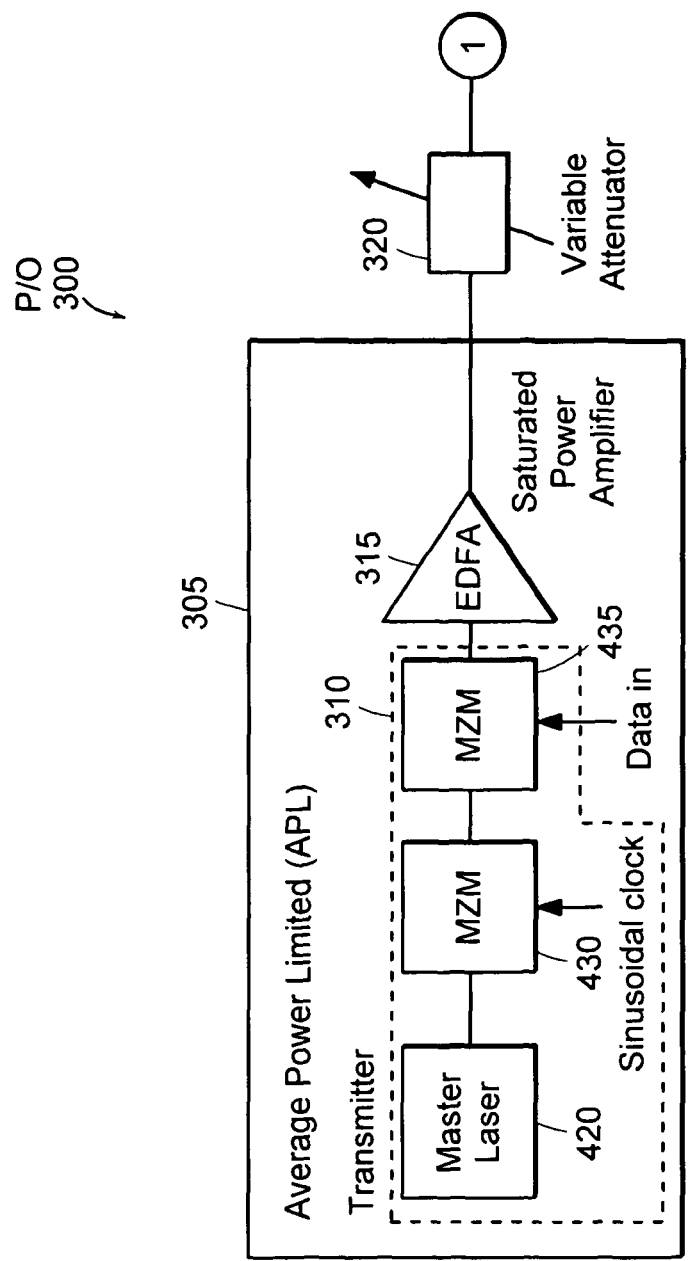
FIG. 3A is a block diagram of a laboratory setup of an optical system having a transmitter and receiver employing the principles of the present invention that may be deployed in the optical network of FIG. 1.
Figures 2, 3A:
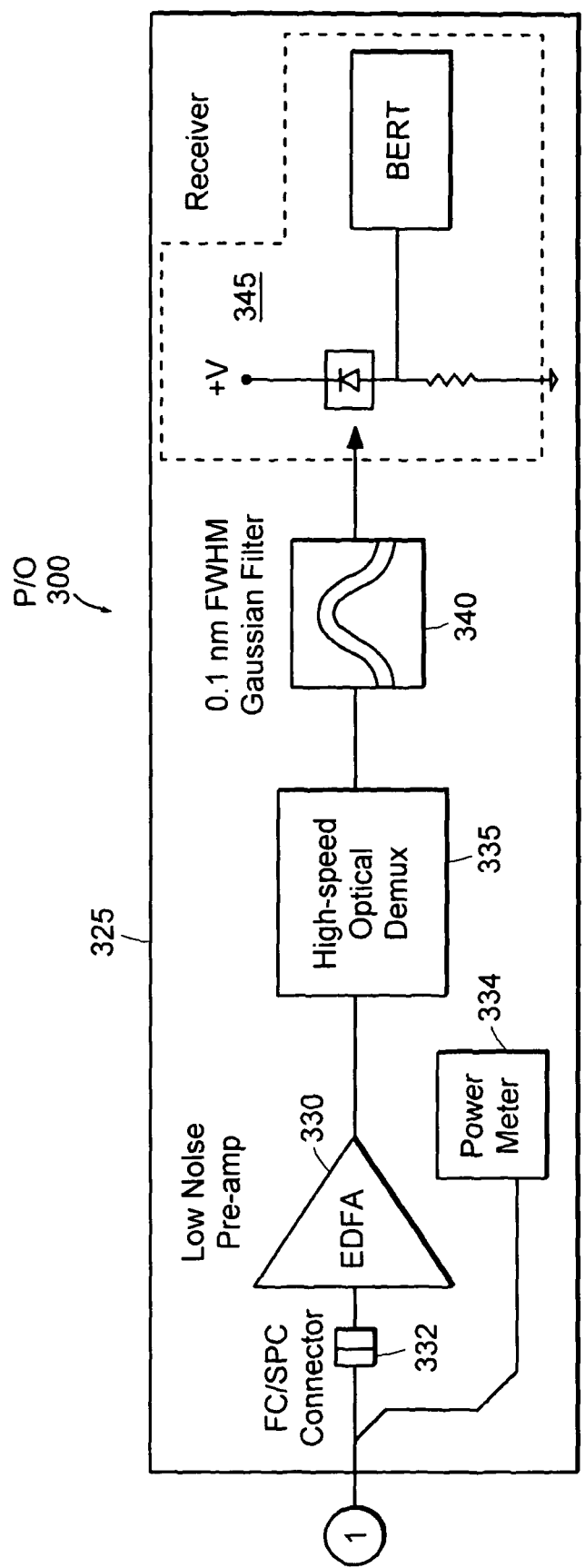

FIG. 3A is a schematic diagram of an experimental setup 300 used to demonstrate a matched optical link. The setup 300 includes a transmitter 305, receiver 325, and variable attenuator 320 optically disposed between the transmitter 305 and receiver 325. The variable attenuator 320 may be used to emulate channel effects such as loss, dispersion, and non-linearities in a communication channel.

The transmitter 305 includes a distributed feedback (DFB) master laser 420 followed by two external Mach-Zehnder modulators (MZM) 430, 435 in series. In this particular embodiment, one of the two MZMs 430 is driven sinusoidally to carve out approximately Gaussian pulses, and the other of the two MZMs 435 imparts a 5 Gbps data on the pulse stream. The master laser 420 and MZMs 430, 435 are hereafter referred to as a Gaussian pulse source 310.

Following the Gaussian pulse source 310, the transmitter 305 includes an optical amplifier 315, such as a saturated erbium-doped fiber amplifier (EDFA) 315, which is average power limited (APL) and, therefore, the transmitted power is independent of choice of signaling waveform. See D. O. Caplan, M. L. Stevens, D. M. Boroson, J. E. Kaufmann, "A Multi-Rate Optical Communications Architecture With High Sensitivity," LEOS, November 1999.

The optical receiver 325 may include a low noise optical preamplifier 330, such as an EDFA 330, a 0.1 nm full wave half maximum (FWHM) optical receiver filter 340, such as a Gaussian optical filter, an optional optical demultiplexer 335, and detection electronics 345.

The transmitter 305 provides 65 psec output pulses that are nearly Gaussian when the first modulator 430 is biased at a transmission maximum and driven by a 2.5 GHz sinewave of amplitude $V_\pi$. The receiver EDFA 330 is nearly quantum limited with an approximate 3 dB noise figure. Average received power measurements are made with respect to the EDFA 330 input connector 332 by a power meter 334 with approximately 0.1 dB accuracy. In the experimental setup 300, the optical receiver filter 340 is a Bragg diffraction grating with an approximately 0.1 nm FWHM Gaussian transfer function.

The Gaussian pulses, which are well matched to the impulse response of the optical receiver filter 340, are generated by adjusting the frequency of the carving modulator 430. The Gaussian pulse shape is particularly attractive since it has the same fundamental shape in both frequency and time domains (see FIGS. 7 and 8, respectively), and it has a relatively flat pass band and a steep roll-off, which reduces sensitivity to pulse width variations, timing jitter, sample duration, and wavelength alignment. These features, coupled with a narrow time-bandwidth product, make the Gaussian an efficient waveform for densely packing both WDM and TDM channels. Moreover, quasi-soliton Gaussian-like waveforms are well suited for use in future dispersion managed terabit per second global networks, as discussed in A. Hasegawa, Y. Kodama, and A. Maruta, "Recent Progress in Dispersion-Managed Soliton Transmission Technologies," Optical Fiber Technology 3, 197-213, 1997.

In the past, designers of optical networks were not particularly concerned with optimizing the match between (i) optical transmitters 305 and receivers 325 and (ii) transmitted signals and optical receiver filters 340; optical networks 300 had more bandwidth than was needed. Now, however, channels in the optical networks are being filled with high-speed content for high-speed applications. In accordance with Shannon's Theorem, $C=B \log_2(1+SNR)$; so to increase the capacity C, the bandwidth B must increase or the SNR must increase. Here, increasing the SNR is being addressed.

To increase the SNR, the optical power can be increased, the detector sensitivity can be increased, or the noise level can be reduced. Increasing the optical power may worsen deleterious non-linearities, so, preferably, the receiver sensitivity is improved and/or the noise level is reduced. Here, not only is the receiver sensitivity improved, but it is done so in a manner that allows for variable rate communication without having to physically change or have multiple receiver components. This is because the EDFAs 315, 330 are average power limited components, as discussed in U.S. application Ser. No. 09/845,053, filed Apr. 27, 2001, entitled "Method and Apparatus for Stabilizing a High-Gain, High-Power, Single Polarization EDFA," by D. O. Caplan and U.S. patent application Ser. No. 09/261,628, filed on Mar. 3, 1999, entitled "Variable-Rate Communication System with Optimal Filtering," by Caplan et al.; the entire teachings of both are incorporated herein by reference.

The increased sensitivity in the optical system 300 has been done in the following manner. First, care has been taken to remove non-shot noise sources so that shot noise becomes the largest noise contribution. Examples of non-shot noise sources include amplified spontaneous emission (ASE) and background noise, such as ambient light (in free space) or other channels in a WDM communication system, which are exaggerated by filter mismatch, timing jitter, and sample duration, which can be reduced by proper choice of waveform (i.e., Gaussian-like). Second, the optical receiver filter 340 is characterized in the time domain. To improve the characterization bandwidth (i.e., resolution), deconvolution and/or cross-correlation techniques are employed, which provides better temporal resolution then using an optical detector alone. Third, the shape of the transmitted signal is designed to match the time domain impulse response of the optical receiver filter 340. As discussed above, the shape of the optical receiver filter 340 is preferably Gaussian or Gaussian-like, and, thus, the pulses provided by the transmitter 305 are designed to be Gaussian or Gaussian-like, which could include waveforms such as a soliton, as well. Fourth, the transmitter 305 provides return-to-zero (RZ) pulses rather than non-return-to-zero (NRZ) waveforms, which allows the receiver 325 to detect the pulses with reduced inter-symbol interference (ISI) penalties.

By improving sensitivity of the receivers as discussed above, in conjunction with employing Gaussian or Gaussian-like RZ optical pulses, the experimental setup 300 has demonstrated record optical communication performance, less than 0.5 dB from quantum limited theory for optically preamplified intensity modulation (IM), such as on-off-keying (OOK) and binary pulse position modulation (PPM). This corresponds to approximately 43 PPB at a $10^{-9}$ BER. Systematically matching the transmitter and receiver waveforms in the optical domain plays a role in achieving these results.

These results demonstrate that the fundamental performance limits, as predicted by matched filter theory, can be nearly attained for high-speed optical communication links without the need for additional wide-band electronic processing. Though demonstrated at 5 Gbps rates, this approach is extendable to other bit-rates (higher or lower), and can be combined with OTDM elements in the receiver, as discussed later in reference to FIG. 14. This has practical implications of both increased sensitivity and reduced complexity in the wide-band receiver electronics 345 for future ultra-high speed networks. Details on this approach to optimizing the communication link and additional benefits of the Gaussian or Gaussian-like and RZ waveforms used are discussed below.

Figure 3B:
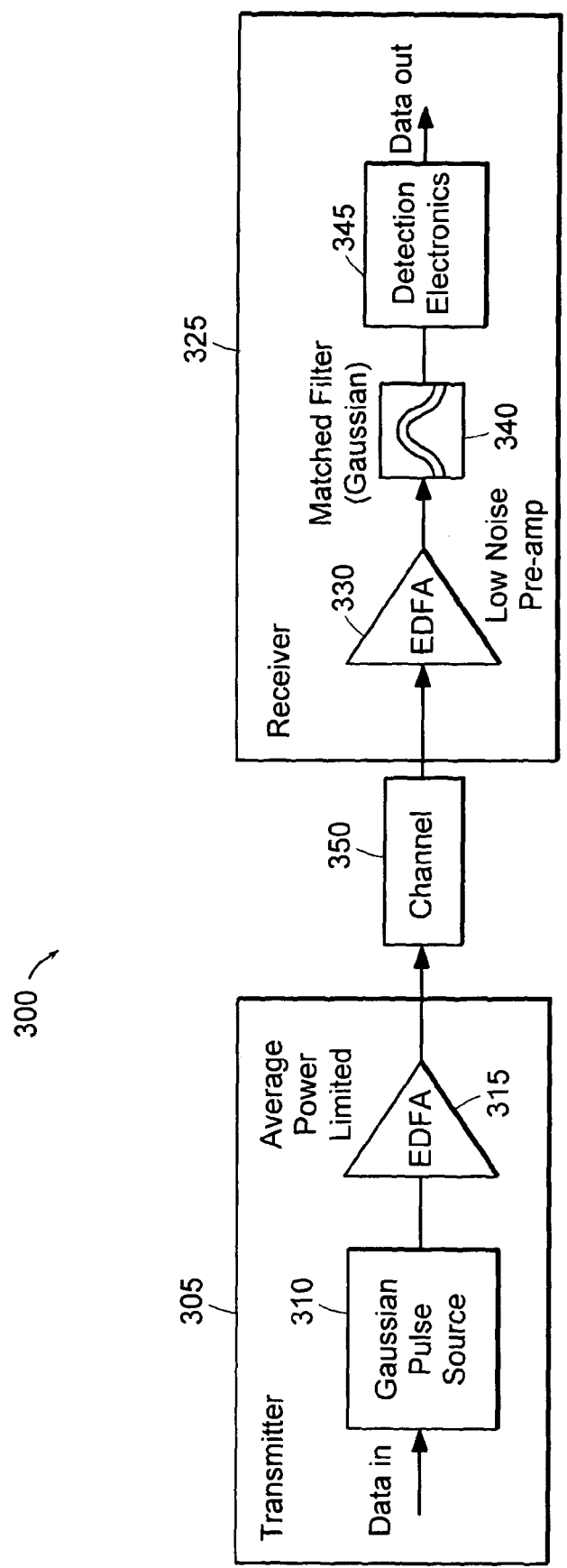
FIG. 3B is a generalized block diagram of the optical system of FIG. 3A.

FIG. 3B is a block diagram of a possible implementation of the optical communication system 300 in an optical network. Rather than transmitting optical signals through the variable attenuator 320 of FIG. 3A, the transmitter 305 transmits optical signals to the receiver 325 through an optical transmission channel 350. The optical transmission channel 350 may include effects such as loss, dispersion, and non-linearities. Average power limited transmit waveforms can be adjusted to compensate for channel distortion effects. See U.S. patent application Ser. No. 09/261,628, filed on Mar. 3, 1999, entitled "Variable-Rate Communication System with Optimal Filtering," by Caplan et al., the entire teachings of which are incorporated herein by reference. In addition, the compensation can be achieved, for example, through the use of standard dispersion compensation techniques either at the transmitter, receiver, or both. In a channel that has only loss, optimum communication performance is achieved by matching transmit waveform, which is to be filtered by the receiver, with the receiver impulse response. In a channel having distortion effects, optimum communication performance is achieved by matching received waveform, which is to be filtered by the receiver, with the receiver impulse response.

Other high sensitivity optical receivers 325 include homodyne and heterodyne receivers. However, these receivers suffer from (i) sensitivity to relative intensity noise (RIN), (ii) laser phase noise, (iii) difficulty in phase-locking the local oscillator laser (not shown) with the incoming signal laser, and (iv) polarization misalignment. Previously, the best homodyne result to date was by Donnier (German Aerospace Company) for inter-satellite links, which demonstrated 20 photons/bit at 565 Mb/s. (S. B. Alexander, in Optical Communication Receiver Design, pp. 273-283, 292-310, SPIE Optical Engineering Press, Bellingham, Wash., USA, 1997). Furthermore, these coherent receivers have only been demonstrated at relatively low (<1 Gbps) rates.

Figure 4:
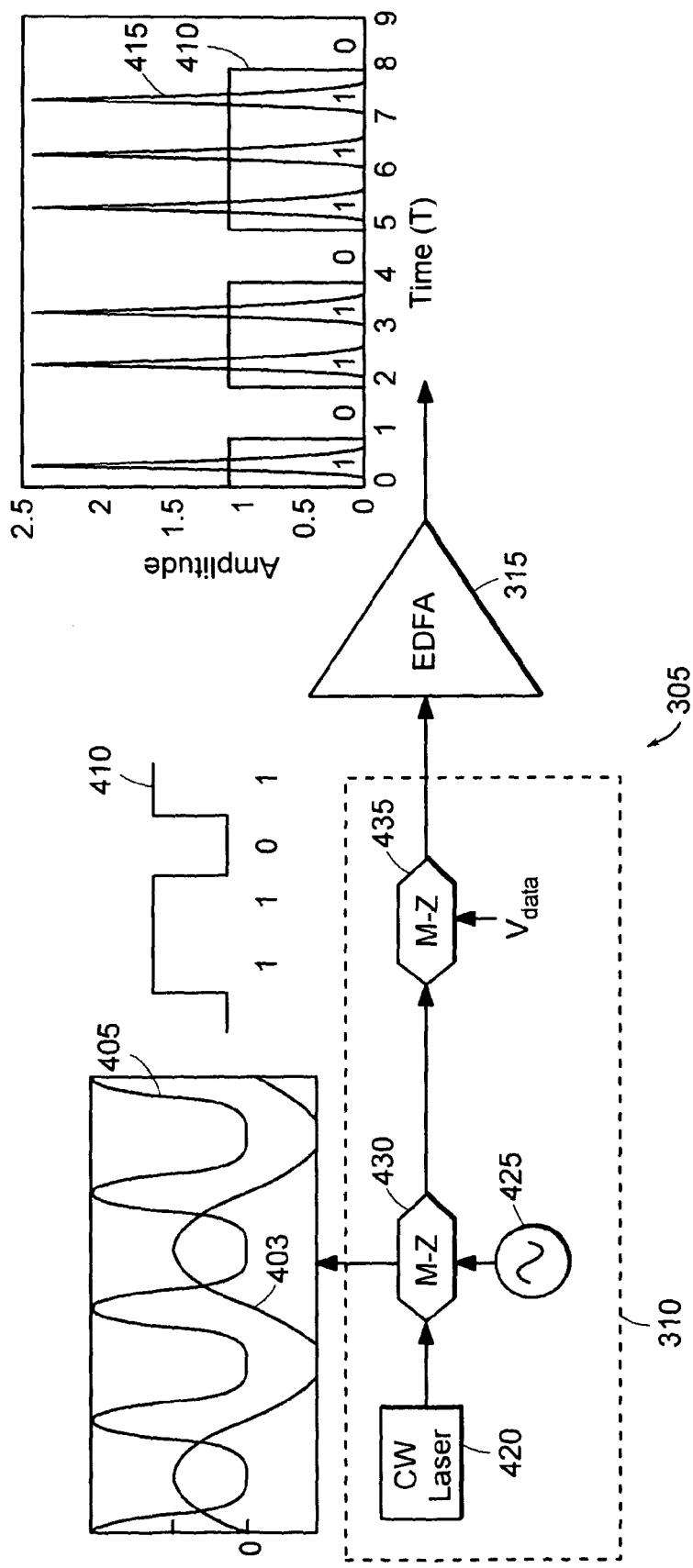
FIG. 4 is a schematic diagram of the transmitter of FIG. 3A and associated waveforms.

FIG. 4 is a block diagram of the optical transmitter 305 with associated signal waveforms indicated beside the corresponding elements. A sinusoidal waveform 403 is generated by the sinusoidal source 425. The first MZM 430 carves out approximately Gaussian pulses 405 from the output of the CW laser 420 in response to the sinusoidal waveform 403. A data signal 410 is input to the second MZM 435. The EDFA 315 amplifies the output from the second MZM 435, producing an average power limited (APL) pulse stream 415 corresponding to the digital waveform 410. It should be noted that the pulse stream 415 is a return-to-zero (RZ) waveform.

The optical transmitter 305 can be a simple, robust, compact, scalable, and low-jitter source. A low voltage drive (not shown) can be used by making the MZMs 430, 435 resonant with the sinusoidal drive 425.

A pulsed, Gaussian, output waveform 415 for $V_{drive}=V_\pi$, biased at a transmission peak, is given by:

$$I(t)=\cos^2[(\pi/2)(V_{drive}/V_\pi)\sin(2\pi ft))]=\sim\exp[-(t*10f)^2]$$

We now turn to the transmitted waveform, and, specifically, to using return-to-zero (RZ) versus non-return-to-zero (NRZ) waveforms. A return-to-zero waveform is pulsed, returning to "zero" level between a "one" bit and a next bit. For example, for a return-to-zero waveform, a pulse stream having two consecutive "one" bits has a zero level between the two "one" bits. A non-return-to-zero waveform does not return to a "zero" level between a "one" bit and a next bit. In the example of two consecutive "one" bits, the non-return-to-zero waveform maintains a "one" level for a duration of two bit periods. A difference in signal-to-noise ratio is observable between using the RZ and NRZ waveforms in the optical system 300 (FIG. 3A), as discussed immediately below.

Figure 5:
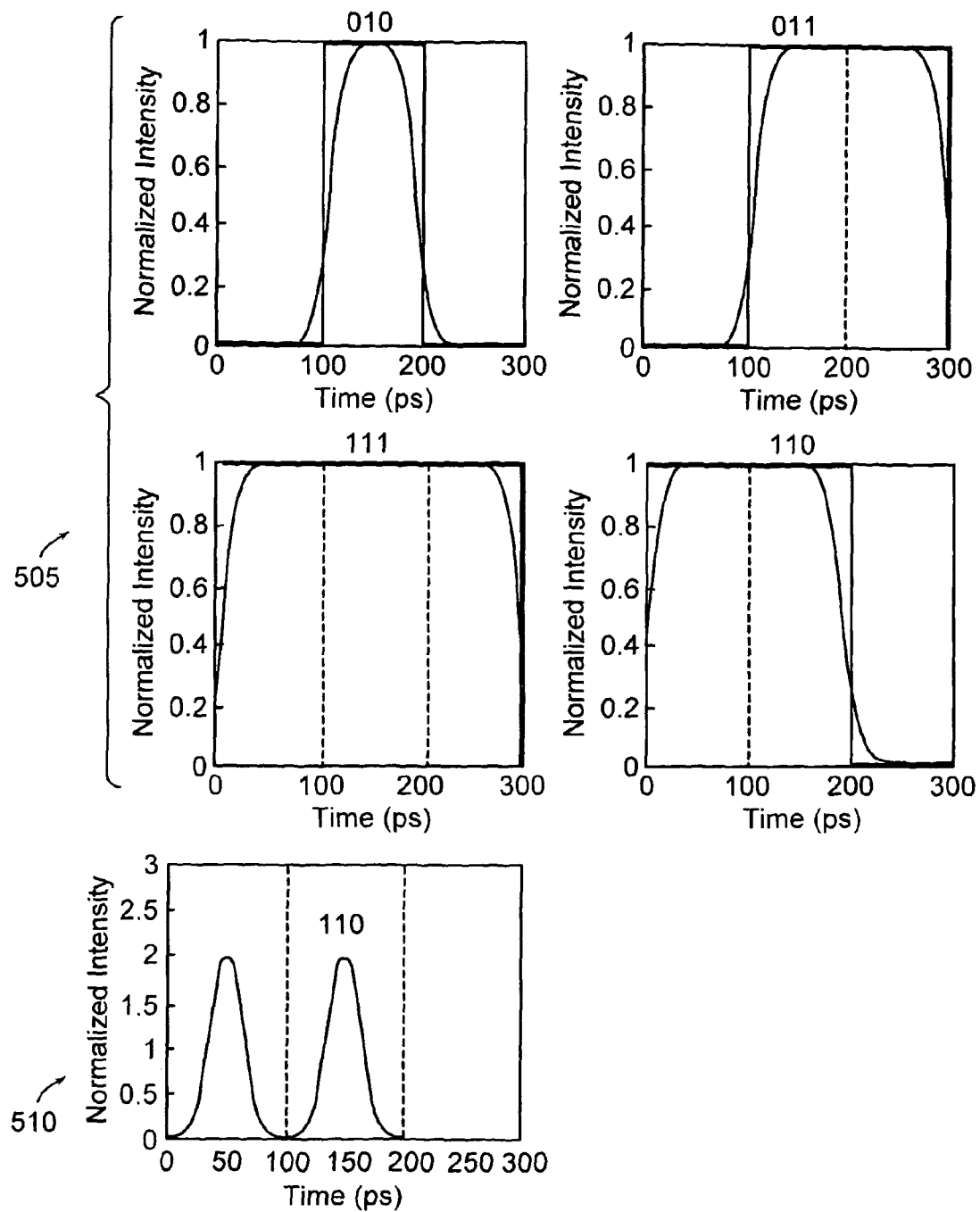
FIG. 5 is a set of time charts of non-return-to-zero (NRZ) and return-to-zero (RZ) waveforms corresponding to the waveforms of FIG. 4.

FIG. 5 provides a distinction of the RZ and NRZ waveforms in terms of matched filters. Signal diagrams 505 include normalized intensity versus time curves for the NRZ waveforms. The finite transmitter bandwidth generates four signal waveforms for high-speed NRZ (>~2 Gb/s). Because there are four signal waveforms that are possible for NRZ waveforms, a single matched filter is not possible.

In contrast, a timing waveform 510 represents an RZ waveform, which has one unique waveform. Thus, a single realizable matched filter is possible for RZ waveforms. Therefore, the RZ waveform has an advantage over NRZ waveforms in terms of matched filtering.

In electrical (RF) communication systems, which are usually peak power limited, it is preferable not to use RZ waveforms in order to transmit maximum average power (see D. O. Caplan, M. L. Stevens, D. M. Boroson, J. E. Kaufmann, "A Multi-rate Optical Communications Architecture with High Sensitivity", LEOS, November 1999 and U.S. application Ser. No. 09/845,053, filed Apr. 27, 2001, entitled "Method and Apparatus for Stabilizing a High-Gain, High-Power, Single Polarization EDFA," by D. O. Caplan. In an RF system, RZ pulses are also not power efficient. In optical communications systems, however, an RZ signal with an average power limited transmitter does not include power penalties because the peak of the pulses increases in an inverse relationship with the duty cycle of the pulses.

Figure 6:
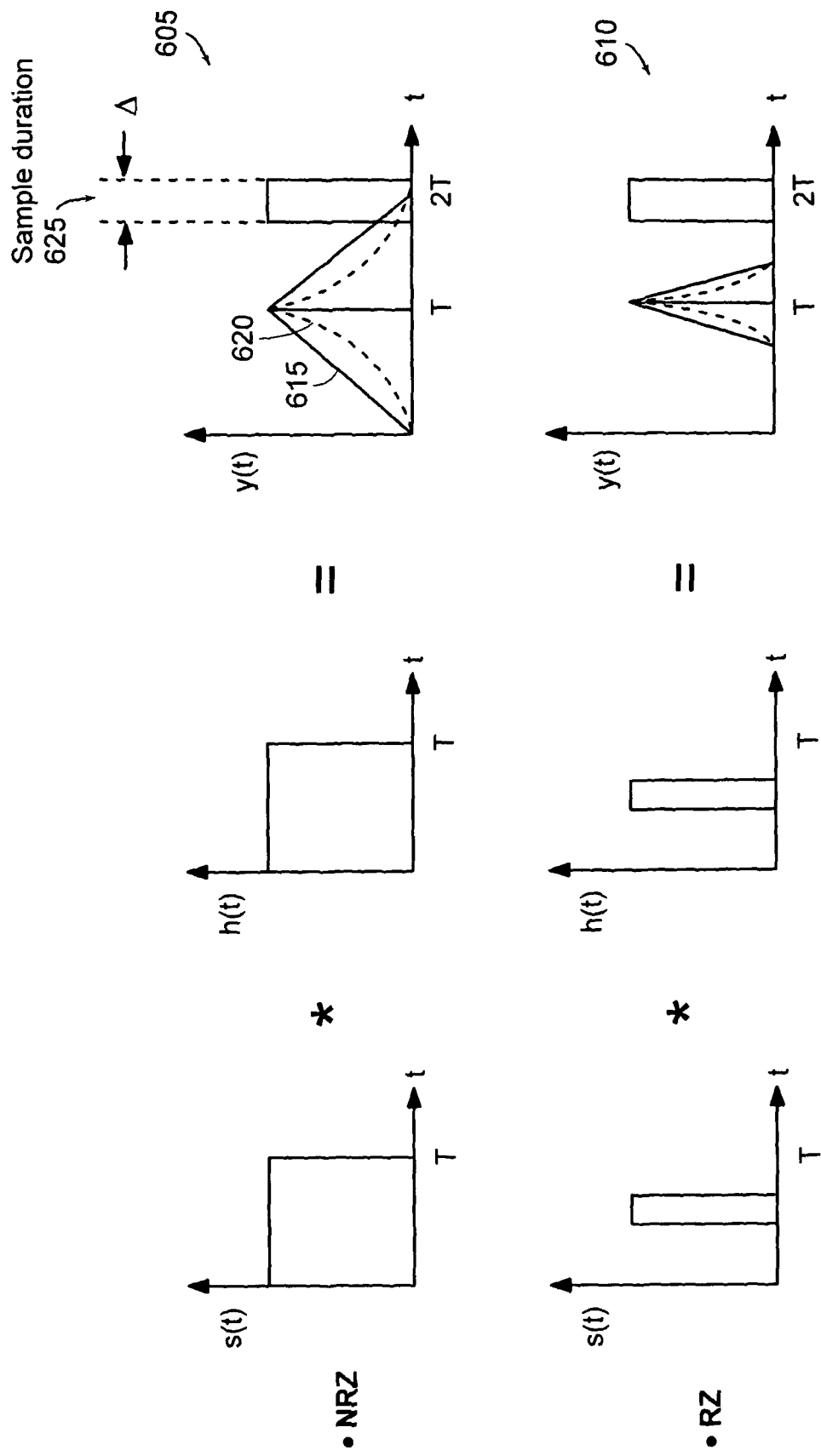
FIG. 6 is a set of NRZ and RZ waveforms of FIG. 5 and convolutions of each, where solid lines represent electric field (E) and dashed lines represent intensity.

FIG. 6 is a set of plots including (i) square NRZ waveforms 605 having an electric field signal s(t), filter impulse response h(t), and the convolved response electric field y(t) 615 and intensity 620; and (ii) similar square RZ waveforms 610. The solid lines represent electric field (E) and dashed lines represent intensity. Direct detection devices, such as photodiodes, are square-law devices with an output proportional to $|E|^2$ or intensity.

Comparison of the results graphically shows another benefit of using pulse RZ waveforms in optical transmission signals, where, although matched filter theory predicts identical sensitivity (i.e., h(t)=s(T−t) and H(f)=S*(f)), finite decision circuit integration time 625 (e.g., from a sample-and-hold circuit) can lead to inter-symbol interference (ISI), even for a matched optical filter.

This inter-symbol interference is observed in the waveform y(t) of the NRZ convolution result. A rectangular box at 2T, representing the finite decision circuit integration time, overlaps with the NRZ convolution output waveform, y(t). In contrast, the RZ convolution result y(t) does not have inter-symbol interference because it does not overlap with the finite decision circuit integration time, despite ideal matching. Thus, the pulse RZ waveforms yield diminished "parasitic" inter-symbol interference as compared to the pulse NRZ waveforms.

Figure 7:
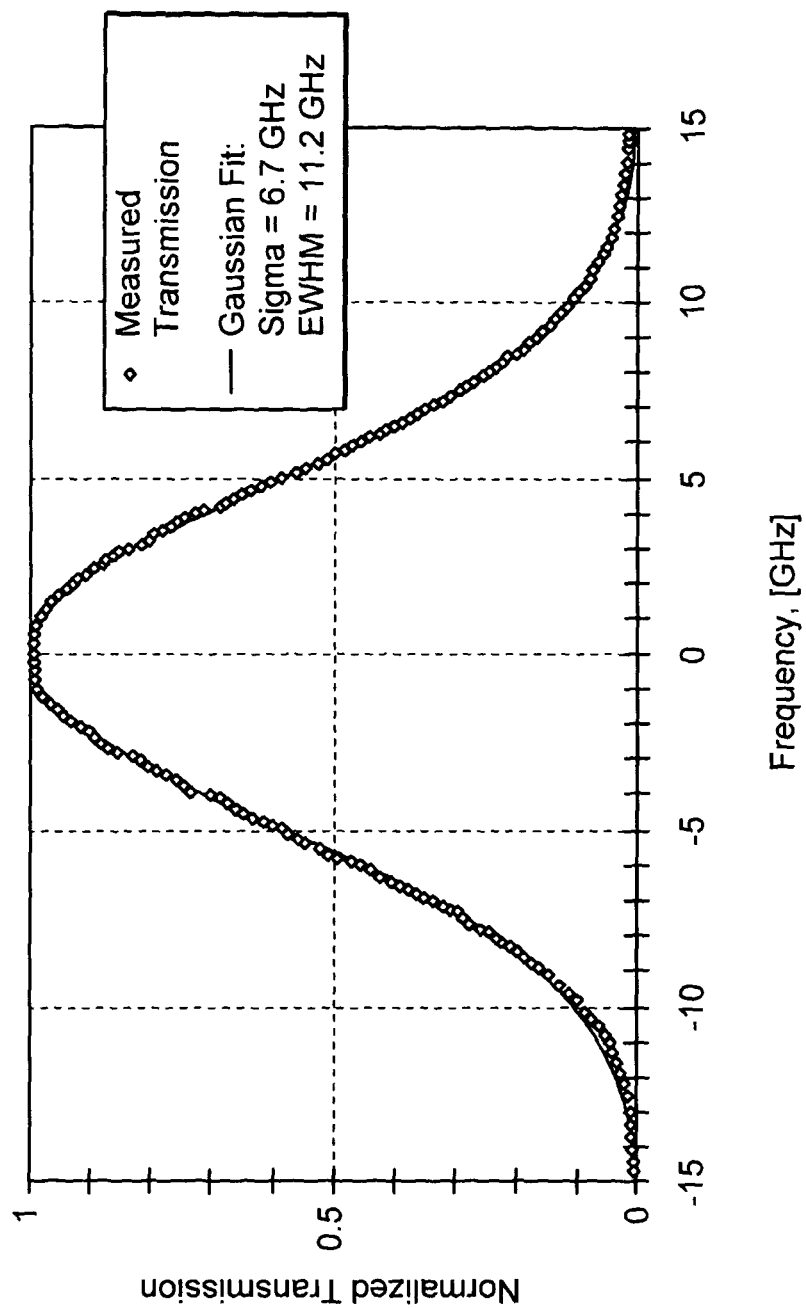
FIG. 7 is a normalized frequency spectrum of a Gaussian optical filter employed in the receiver of FIG. 3A.

FIG. 7 is a plot of a measured transmission spectrum of the optical receiver filter 340 (FIG. 3A) and Gaussian fit 710 to that measured transmission spectrum 705. These curves 705, 710 show just how close the optical receiver filter 340 can be designed to have a prescribed Gaussian shape.

Figure 8:
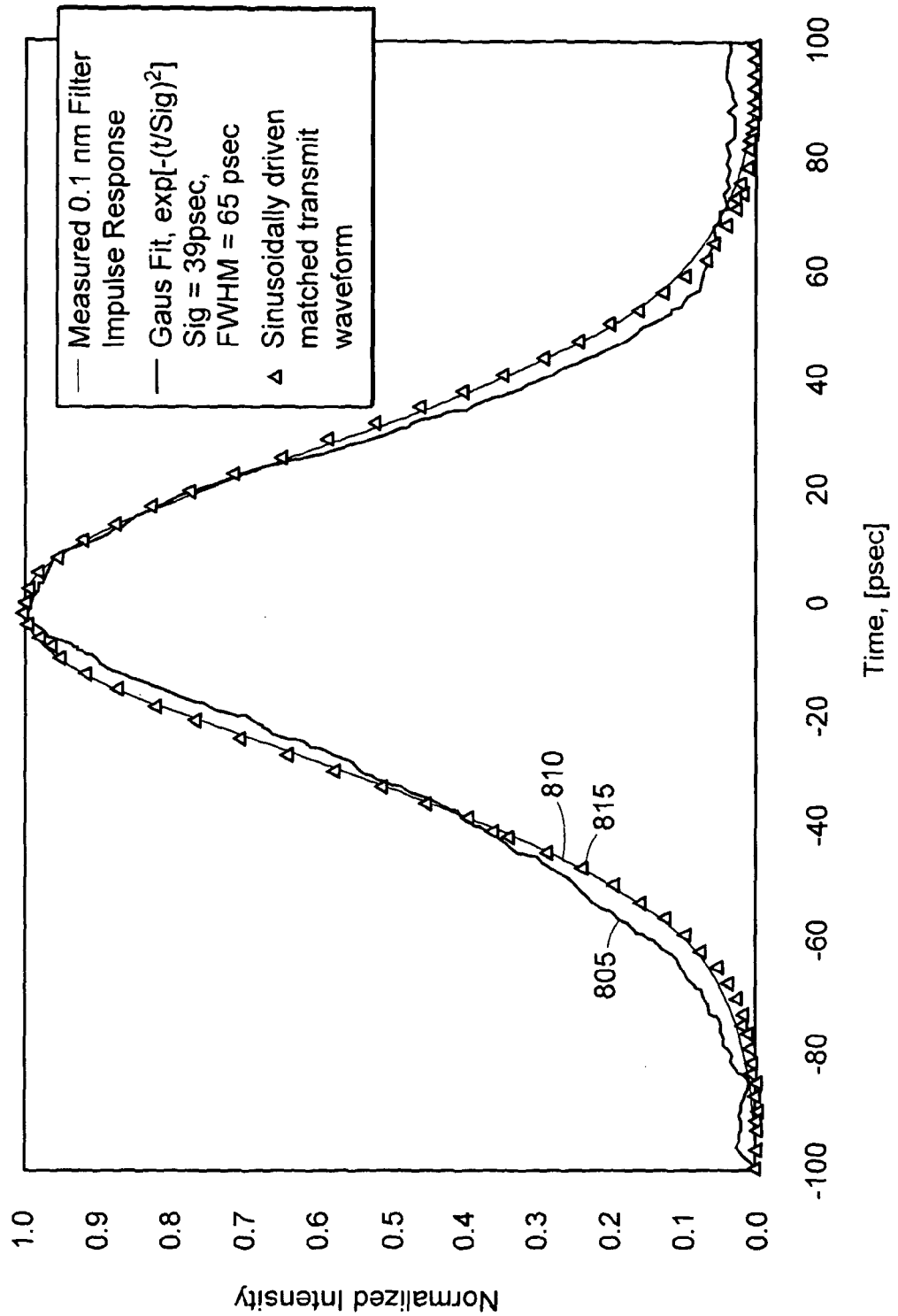
FIG. 8 is a normalized intensity time chart corresponding to the optical filter employed in the optical receiver of FIG. 3A.

FIG. 8 is a time chart showing a measured 0.1 nm filter impulse response 805 for the optical receiver filter 340. Further, the time chart of FIG. 8 includes a Gaussian fit 810 in the time domain for the measured filter impulse 805 in the time domain. This time-chart also includes a sinusoidally driven, matched, transmit waveform 815, represented by the triangular points, which are well aligned to the Gaussian fit curve 810.

Based on the driven, matched, transmit waveform 815, it is clear that the transmitter 305 (FIG. 3A) can be made to generate an optical pulse very close to a Gaussian curve in the time domain and the frequency domain. Thus, by having a good measurement of the optical receiver filter 340 and designing that optical receiver filter 340 to have an impulse response in the shape of a Gaussian or Gaussian-like or symmetric pulse shape, a nearly perfect match can be attained between the transmitted optical signal and the impulse response of the optical receiver filter 340.

Figure 9A:
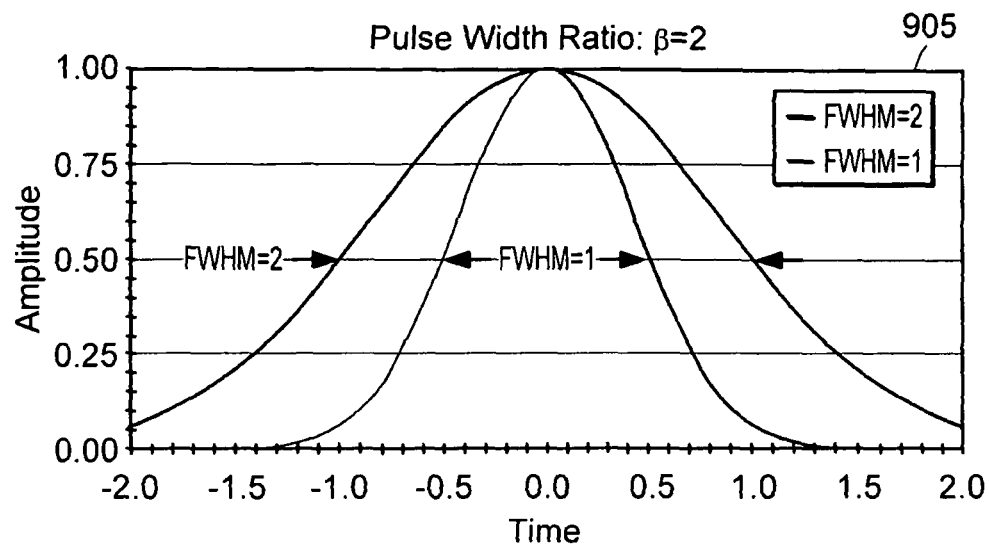
FIGS. 9A-9C are charts of SNR sensitivity to filter matching for the optical filter employed in the receiver of FIG. 3A, illustrating the benefits of the Gaussian-like pulses compared to commonly used square RZ and NRZ waveforms.
Figure 9B:
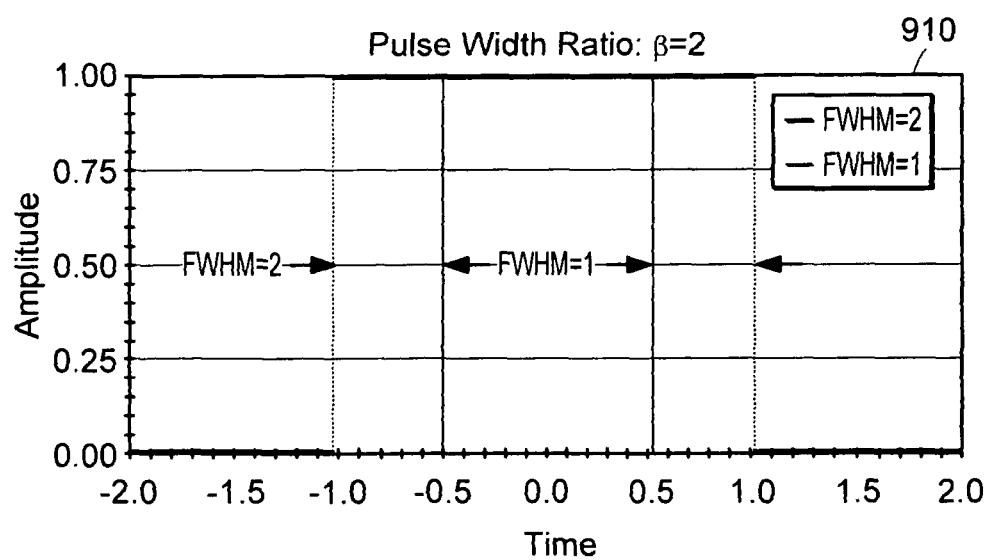
Figure 9C:
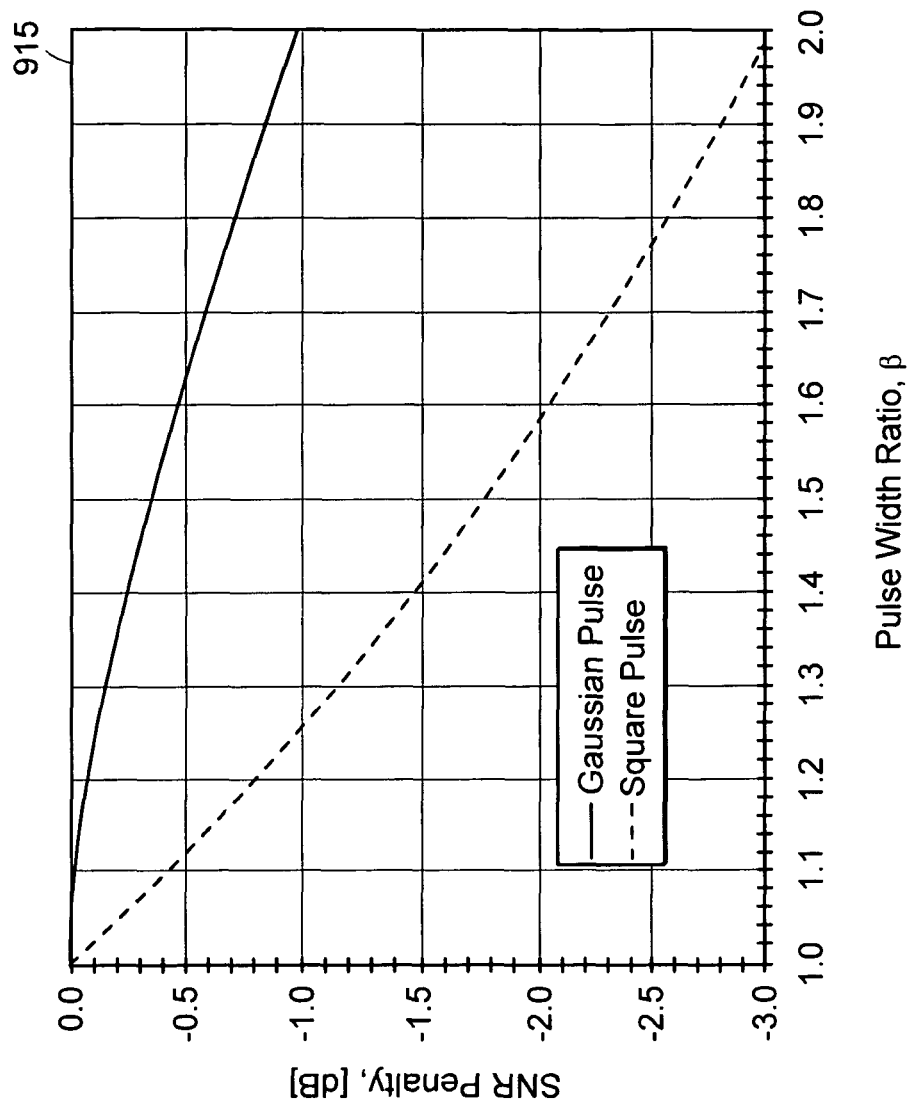

However, the SNR penalty for Gaussian-like waveforms is relatively insensitive to the accuracy of matching as illustrated in FIGS. 9A-9C. FIGS. 9A-9C include a first plot 905 (FIG. 9A) having time domain Gaussian curves, a second plot 910 (FIG. 9B) having time domain square curves, and a third plot 915 (FIG. 9C) having curves comparing a SNR penalty as a function of β, the ratio of the transmitted pulse width to receiver impulse response pulse width. As can be seen from the SNR penalty curves in the third plot 915 (FIG. 9C), a factor of two pulse width mismatch (β=2) for the Gaussian pulse waveforms 905 (FIG. 9A) leads to less than 1 dB SNR penalty compared to a 3 dB degradation for the square pulse waveforms 910 (FIG. 9B).

Thus, using Gaussian-like waveforms as a means for communicating digital information yields improved receiver SNR as transmitter waveforms and receiver filtering become mismatched, or, in other words, it is easier to generate nearly matched performance using these waveforms. This is of practical significance since it reduces the tolerances on producing precise transmit waveforms and receiver filters, and results in improved communication performance as waveforms become distorted due to channel effects, or as elements in the transmitter and receiver degrade.

Using Gaussian-like waveforms facilitates the matching of the received signal waveform to the optical receiver impulse response, improving SNR at the receiver. Since conventional optical communication systems are typically poorly matched, better matching can be used to improve the received SNR without increasing transmitted power. This can in turn, reduce deleterious nonlinearities, which can ultimately limit the capacity of a fiber optic network.

These features, coupled with a narrow time-bandwidth product, make the Gaussian pulse an efficient waveform for densely packing both WDM and TDM channels. Moreover, quasi-soliton Gaussian-like waveforms are well suited for use in future dispersion managed terabit per second global networks (see A. Hasegawa, Y. Kodama, and A. Maruta, "Recent Progress in Dispersion-Managed Soliton Transmission Technologies," Optical Fiber Technology 3, 197-213, 1997) and are also suitable for use in the present invention optical communication system.

Figure 10A:
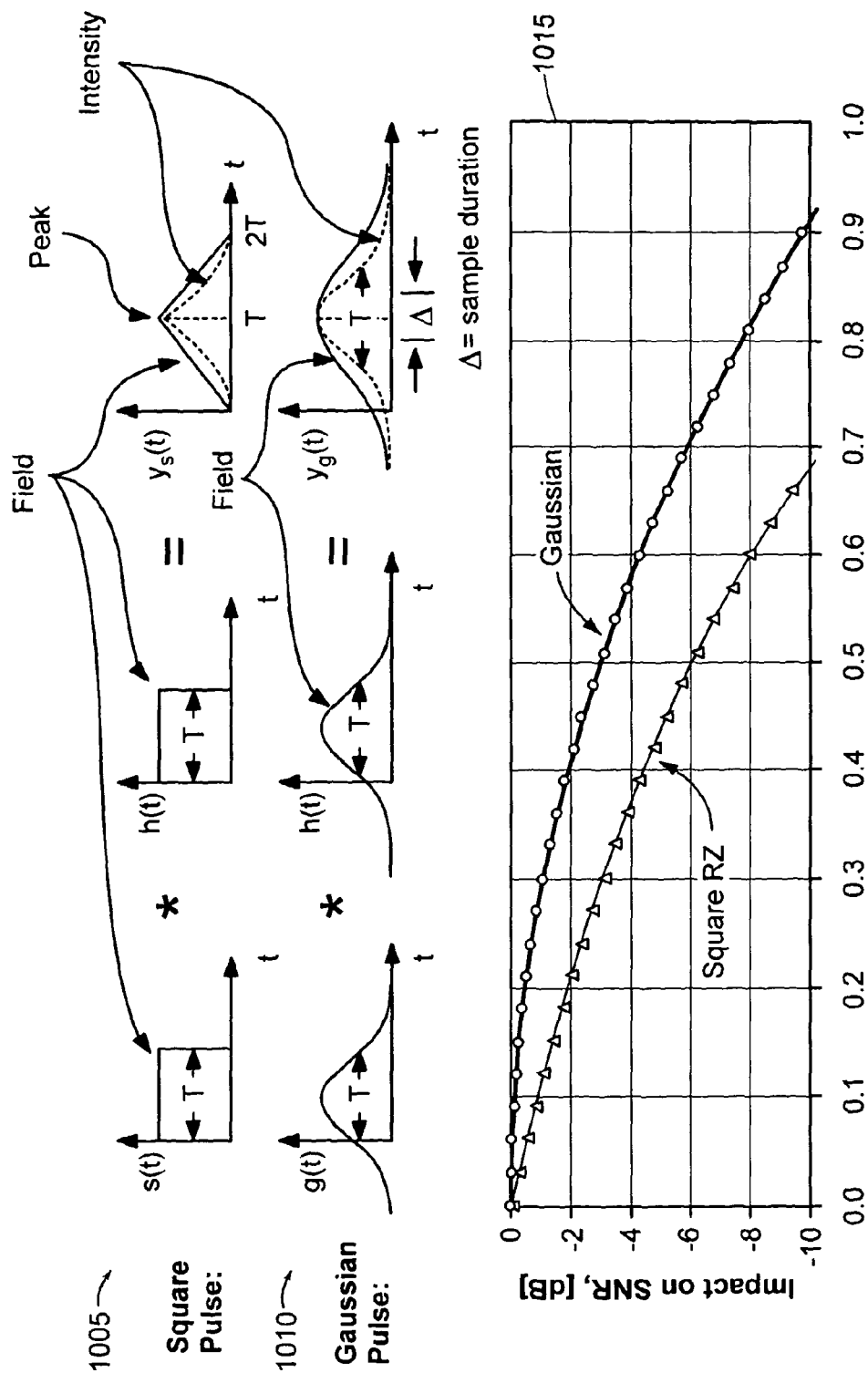
FIG. 10A-10B are charts of SNR sensitivity to timing jitter and sample duration relating to the signal produced by the transmitter of FIG. 3A, illustrating the benefits of the Gaussian-like pulses compared to commonly used square RZ and NRZ waveforms.

FIG. 10A compares SNR sensitivity to timing jitter for a square pulse 1005 to a Gaussian pulse 1010. Because of the convolution, indicated by the "*", which tends to broaden and smoothen a pulse, and because optical detectors are "square law" devices, the square pulse 1005 rolls off very fast, whereas the Gaussian pulse 1010 does not roll off as fast.

A plot 1015 includes curves representing calculated SNR penalty as a function of time deviation from the optimal sampling point of the output for the matched square and Gaussian waveforms. The time deviation is normalized to the FWHM of each pulsed waveform.

The Gaussian pulse sensitivity to timing jitter is significantly better than for the square waveform. For instance, a 20% deviation causes a 2 dB degradation in SNR for the square waveform, while a 20% deviation causes only approximately 0.2 dB degradation in SNR for the Gaussian waveform.

This reduced sensitivity can drastically reduce the impact of deleterious effects, such as Gordon-Haus timing jitter, and simplify the tolerances, accuracy, and sampling speed of clock-recovery and detection hardware.

Figure 10B:
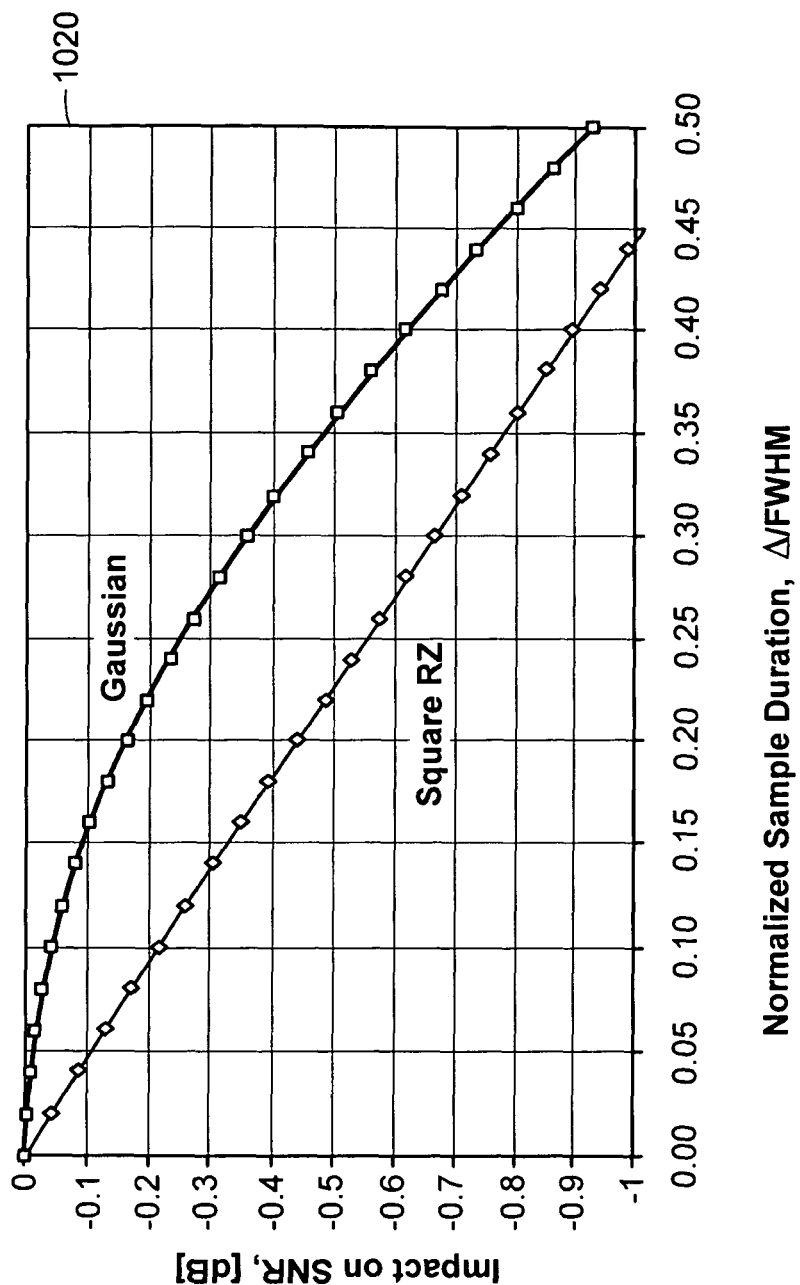
Figure 11:
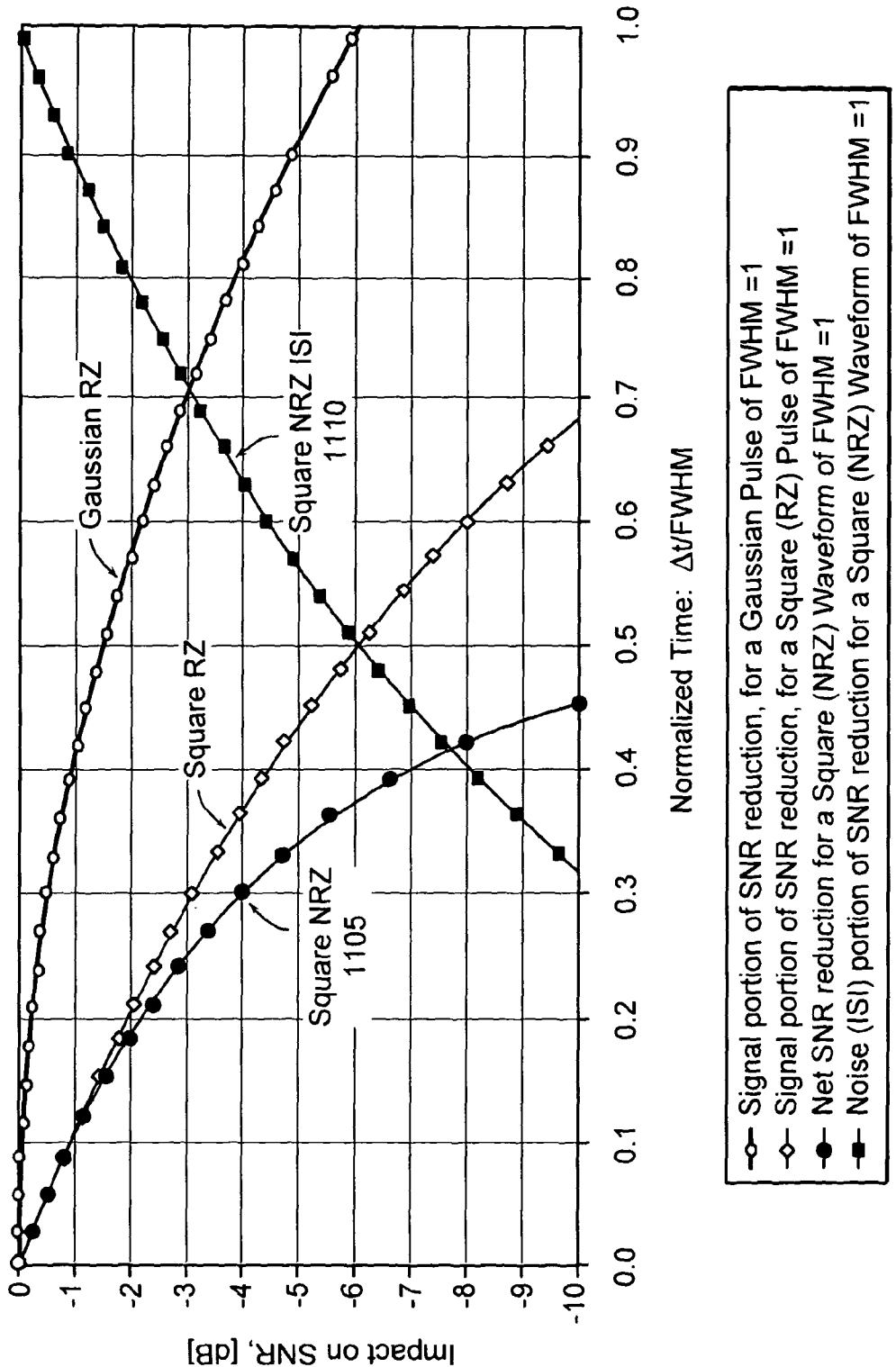
FIG. 11 is a chart relating SNR sensitivity to timing jitter for the system of FIG. 3A, illustrating the benefits of the Gaussian-like pulses compared to commonly used square RZ and NRZ waveforms.

FIG. 11 is another chart of SNR sensitivity to timing jitter that includes the Gaussian RZ and square RZ curves as seen in FIG. 10 and also includes NRZ curves 1105 and 1110 without inter-symbol interference and with inter-symbol interference, respectively. Timing jitter leads to ISI for square NRZ waveforms (see also FIG. 6). The curve 1110 represents the signal to ISI ratio which increases as the amount of timing jitter increases. The 0 dB ISI level that occurs when the timing jitter is 1.0 (or equal to the pulse width) indicates that the ISI is as large as the signal.

FIG. 10B compares SNR sensitivity to sample duration for the square pulse 1005 to a Gaussian pulse 1010. A plot 1020 includes curves representing calculated SNR penalty as a function of sample duration of the matched filter output. The sample duration is normalized to the FWHM of each pulsed waveform.

Ideally, the sample point at time T (FIG. 10) is a delta function, i.e. approximately 1% or shorter than the pulse width being sampled so that it can sample the peak of the resulting waveform at the highest SNR. However, as communication rates continue to push the bandwidth limits of electronics, this sample duration has been expanding relative to the short pulses being used, effectively causing averaging over the time of the sample. For the same reasons that the Gaussian-like waveforms reduce the impact of timing jitter, they also reduce the impact of sampling duration on communication performance.

The Gaussian pulse sensitivity to sample duration is significantly better that for the square waveform. For instance, a 15% of FHWM time sample duration leads to more than a 0.3 dB degradation in SNR for the square waveform, while a 15% deviation causes less than a 0.1 dB SNR penalty for the Gaussian waveform. For a 10 Gbps NRZ square data stream with a period and FWHM of 100 psec, a 0.1 dB penalty corresponds to a sample time of ~4 psec. For a 10 Gbps RZ square pulses with a 25% duty cycle, the sample time reduces to ~1 psec for the 0.1 dB penalty, while for the 10 Gbps Gaussian pulses generated by a 5 GHz sinusoidal drive, the sample time is ~5 psec for the 0.1 dB penalty. Thus, the Gaussian is a factor of approximately five or more tolerant than square RZ pulses and approximately 20% better than square NRZ waveforms.

Figure 12:
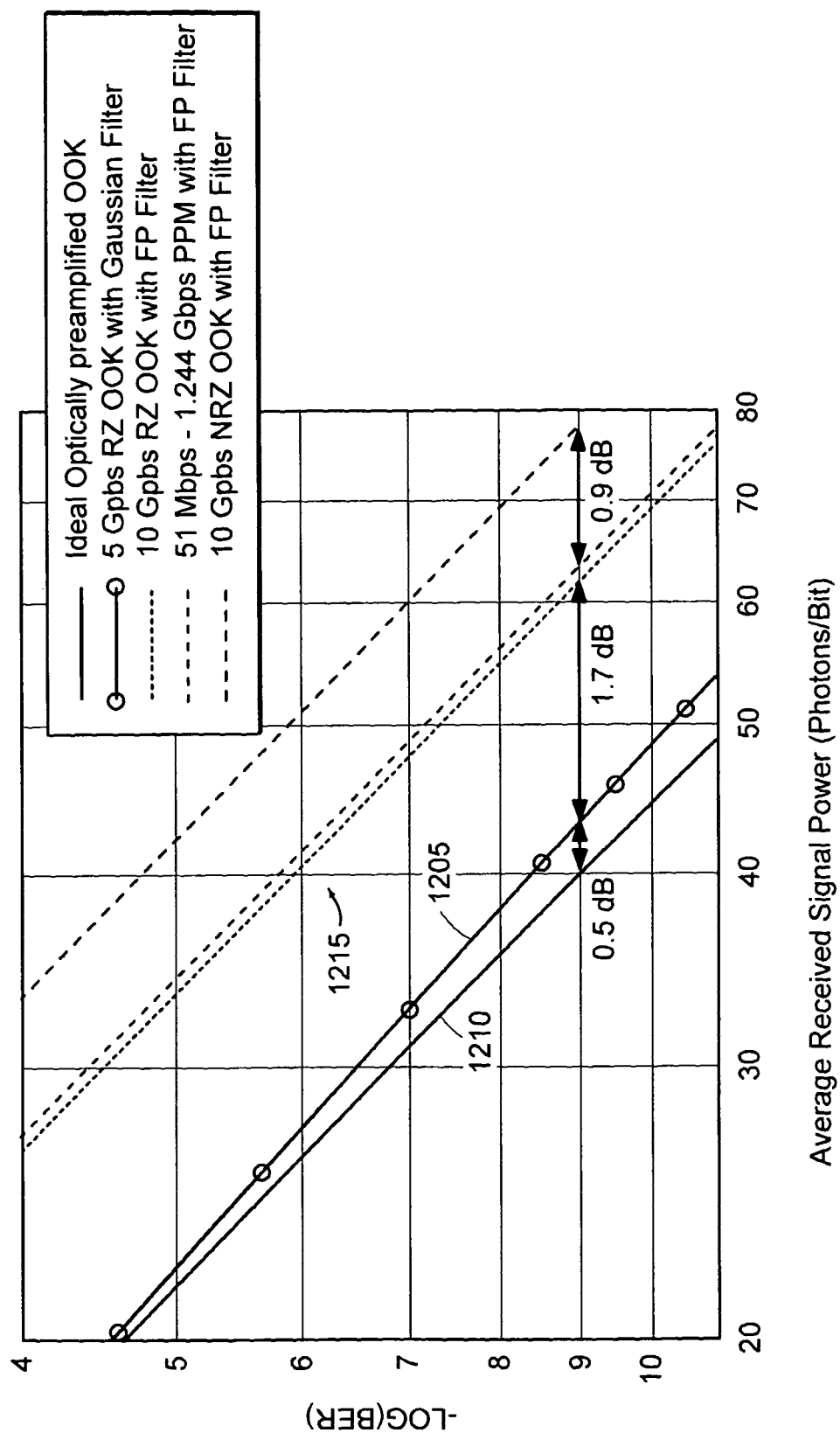
FIG. 12 is a chart of demonstrated performance by the system of FIG. 3A.

FIG. 12 is a chart of results of demonstrated performance for the system 300 (FIG. 3A) using the matching and waveform techniques as described above. The measured communication performance is shown as curve 1205 for a ($2^{31}$–1) pseudo-random bit sequence (PRBS). Also shown for comparison are curves 1215 for previous, high-sensitivity, optically preamplified, intensity modulation experiments. These data show that performance within 0.5 dB of the quantum-limit theory curve 1210 can be attained and represent the best high-rate (Gbps) performance to date.

Figure 13A:
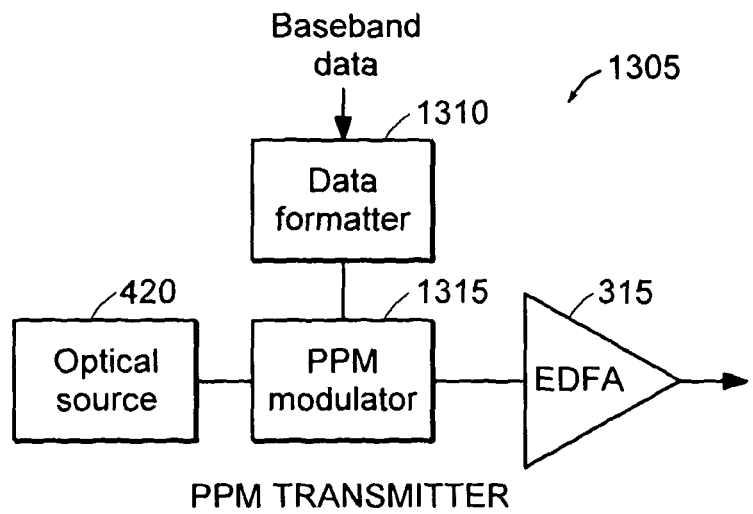
FIG. 13A-13C is an alternative embodiment of the system of FIG. 3A and variable duty-cycle signaling waveforms supported thereby.
Figure 13B:
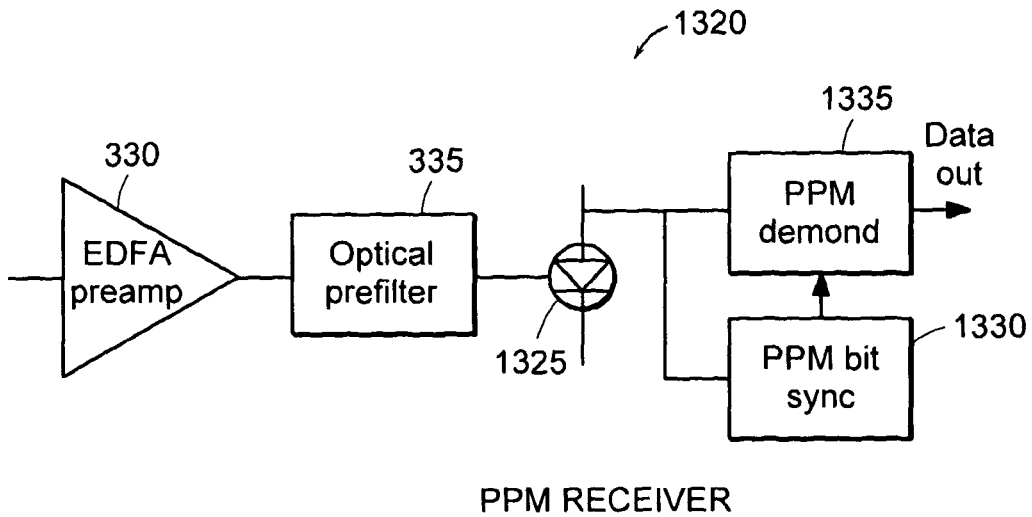
Figure 13C:
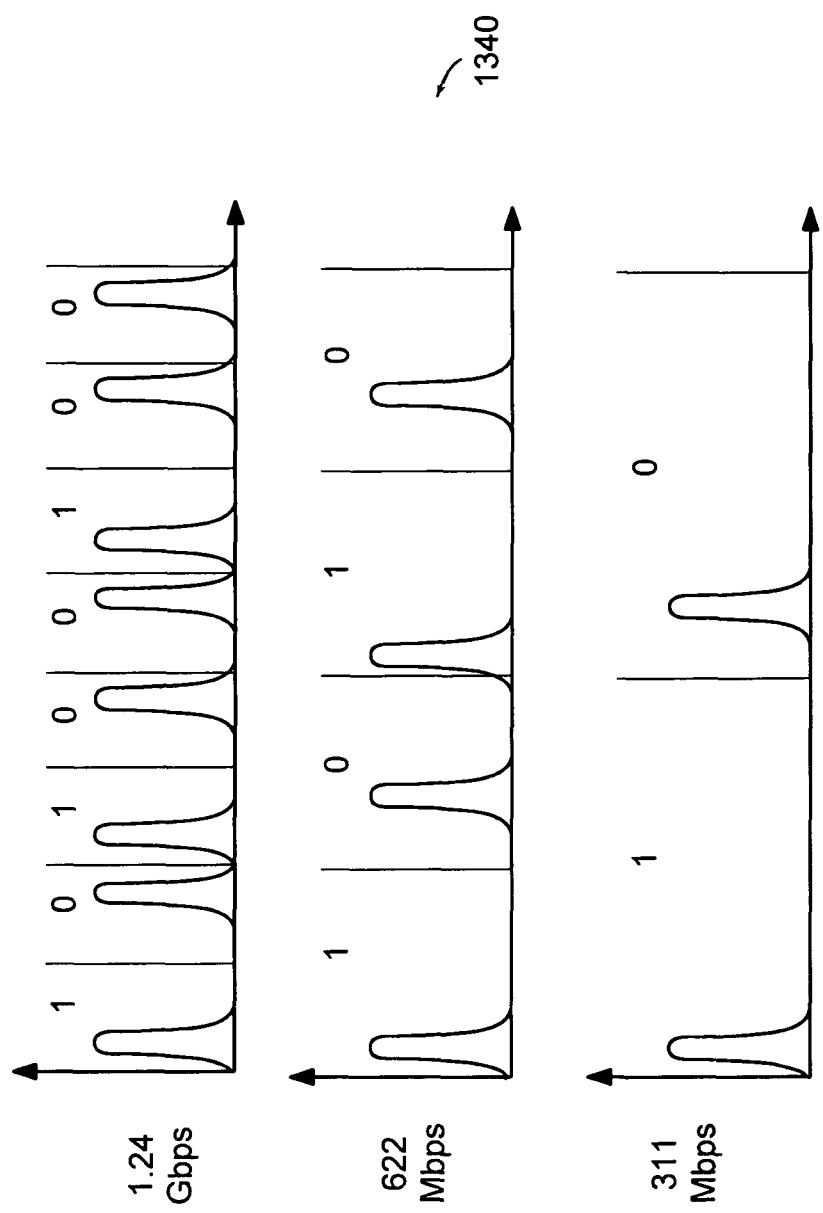

FIGS. 13A-13C are schematic diagrams of a transmitter 1305 (FIG. 13A) and receiver 1320 (FIG. 13B) that provides variable duty-cycle pulse position modulation (PPM) signaling (FIG. 13C). Referring to FIG. 13A, the transmitter 1305 includes the optical source 420 and EDFA 315. The transmitter 1305 also includes a data formatter 1310 that formats baseband data and provides the formatted baseband data to a pulse position modulator (PPM) 1315.

Referring to FIG. 13B, the PPM receiver 1320 includes the EDFA preamplifier 330 and optical prefilter 335. The PPM receiver 1320 also includes an optical detector 1325 that converts the optical signal to an electrical signal. Following the optical detector 1325 is a PPM bit synchronizer 1330 and PPM demodulator 1335, which provides an output of data in the baseband.

The variable duty-cycle PPM signaling of FIG. 13C simplifies the PPM receiver 1320 in the following manner. The optical prefilter 335 is matched to the highest data rate (e.g., 1.24 Gbps) from among the data rates (e.g., represented by pulse streams 1340) capable of being provided by the transmitter 1305. Further, there is no PPM receiver 1320 sensitivity penalty at lower data rates (e.g., 622 Mbps and 311 Mbps of the pulse streams 1340); this has been verified by laboratory BER measurements. Additionally, there is no transmit EDFA 315 power penalty since a constant average power (APL) at all rates occurs, as discussed above and in (i) U.S. application Ser. No. 09/845,053, filed Apr. 27, 2001, entitled "Method and Apparatus for Stabilizing a High-Gain, High-Power, Single Polarization EDFA," by D. O. Caplan and (ii) U.S. patent application Ser. No. 09/261,628, filed on Mar. 3, 1999, entitled "Variable-Rate Communication System with Optimal Filtering," by Caplan et al., the entire teachings of both are incorporated herein by reference.

Figure 14:
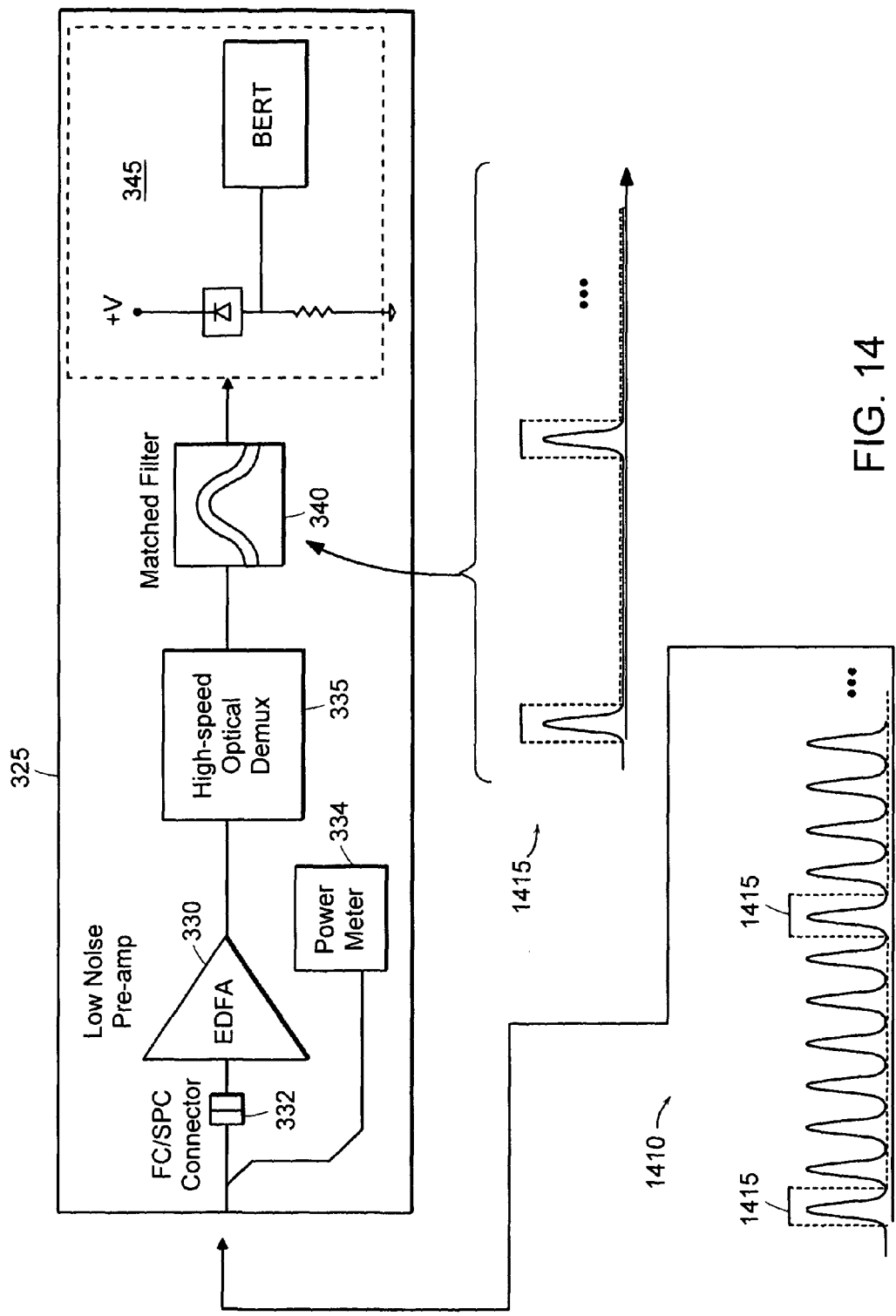
FIG. 14 is a block diagram of the receiver of FIG. 3A and a time division multiplexed (TDM) pulse pattern supported by the high speed optical demultiplexing therein.

FIG. 14 is the schematic diagram of the optical receiver 325 (FIG. 3A) used in an application having ultra-high bit-rates. Near optimum performance can be obtained at any rate less than the maximum, determined by the choice of fundamental pulse shape, by using the same pulsed waveform at reduced duty-cycles. See U.S. application Ser. No. 09/845,053, filed Apr. 27, 2001, entitled "Method and Apparatus for Stabilizing a High-Gain, High-Power, Single Polarization EDFA," by D. O. Caplan; U.S. patent application Ser. No. 09/261,628, filed on Mar. 3, 1999, entitled "Variable-Rate Communication System with Optimal Filtering," by Caplan et al.; and D. Caplan, M. Stevens, D. Boroson, J. Kaufmann, "A Multi-Rate Optical Communications Architecture with High Sensitivity," LEOS, November 1999. By inserting a high-speed optical demultiplexer after the EDFA preamplifier 330, one channel 1415 from an ultra-high-speed optical TDM (OTDM) data stream 1410 can be selected prior to the optical receiver filter 340. Good receiver 325 sensitivities can still be maintained at the reduced duty-cycles without the need for ultra-wide-band electronics, as long as the detection electronics are fast enough to resolve the multiplexed data.

For example, one 2.5 Gbps channel from an aggregated 100 Gbps OTDM data stream could be received with the use of an approximately 10 psec resolution optical demultiplexer 335, the optical receiver filter 340 matched to the demultiplexed 100 GHz pulses, and readily available electronics 345 for detecting the lower rate 2.5 Gbps data.

Note that the output of the approximately matched optical receiver filter 340 does not necessarily need to proceed directly to a photodetector for optical-to-electronic conversion. Since the high SNR signal remains in the optical domain, it could potentially be distributed further in the network, for instance, to multiple time-sharing users within an optical local area network (LAN), not shown.

Figure 15B:
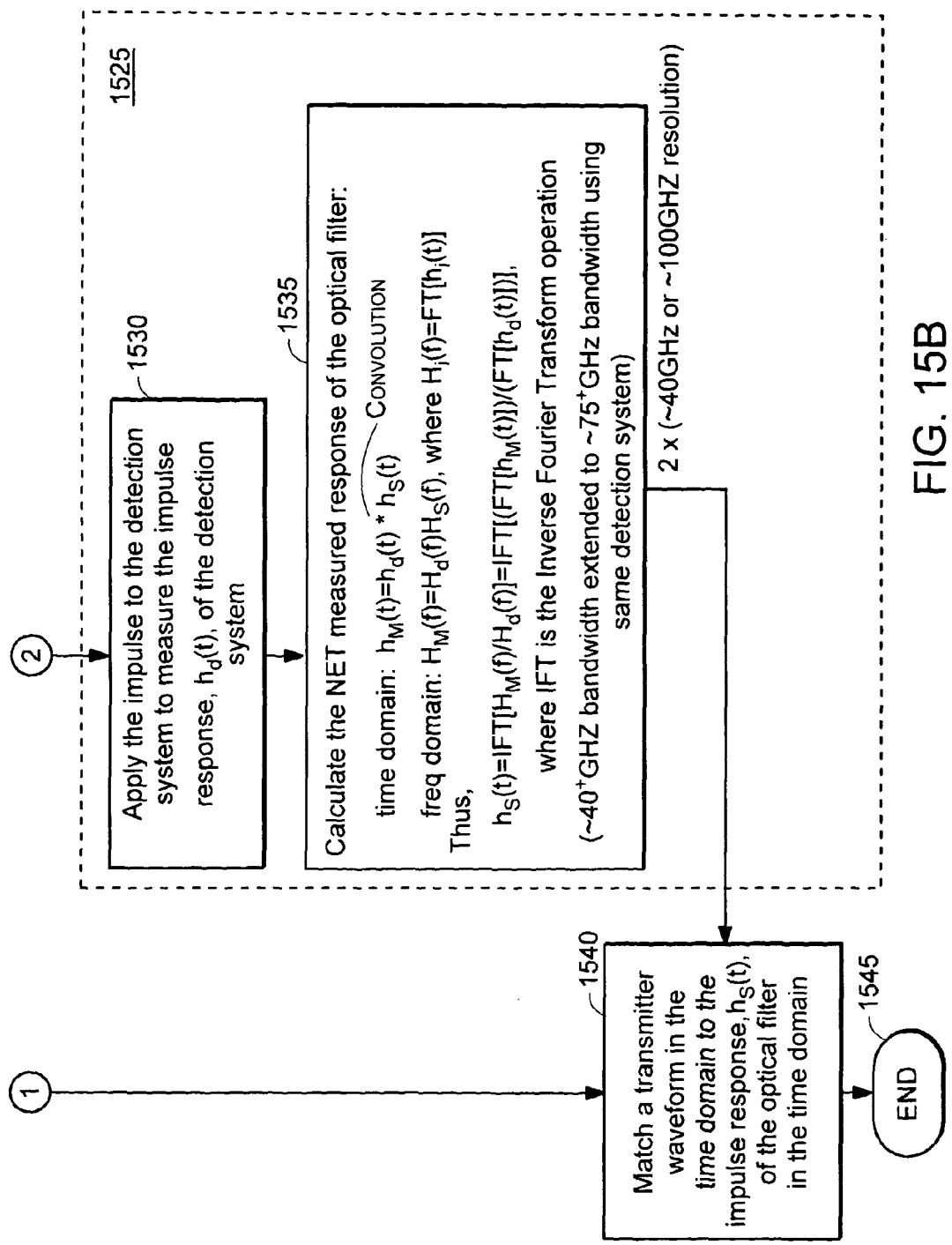
FIG. 15 is a flow diagram of a process used by a designer and/or manufacturer of the optical receiver of FIG. 3B.

FIG. 15 is a flow diagram of a process 1500 for designing and/or manufacturing an optical receiver that has a time domain impulse response that matches a time domain waveform of a transmitted optical pulse. An example of the matching time domain curves of the optical receiver filter 340 and the optical receiver 325 that matches the transmitted optical pulse 415 (FIG. 4) was shown in FIG. 8 and described in reference thereto. The process 1500 also includes a deconvolution process 1525 for improving the measurement results of a detection system (e.g., (i) oscilloscope and photodetector or (ii) cross-correlation) used to measure the impulse response of the optical receiver filter 340.

The process 1500 begins in 1505. In step 1510, the process 1500 applies an optical impulse (e.g., a short, approximately 1 psec, optical pulse) to a candidate optical receiver filter 340 to be used in the optical receiver 325. In step 1512, the process 1500 determines how much measurement resolution is to be used, either normal or high resolution. If normal resolution, then, in step 1515, the process 1500 prescribes using a detection system (e.g., ~40+ GHz oscilloscope) to measure a signal impulse response, $h_s(t)$, of the optical receiver filter 340 in the time domain (~40+ GHz). If high resolution, then, in step 1517, the process 1500 prescribes using a cross-correlator (e.g., 100 GHz class or beyond) to measure the signal impulse response, $h_s(t)$, of the optical receiver filter 340 in the time domain (~100+ GHz). See S. Shapiro, in Ultrashort Light Pulses Pico Second Techniques and Applications, pp. 83-122, Springer Verlag, N.Y., 1977; B. P. Nelson and N. J. Doran, "Optical sampling oscilloscope using nonlinear fibre loop mirror", Electronic Letters, p. 204-205, v. 27, no. 3, 31 Jan. 1991; and N. S. Patel. al, "Optical rate conversion for high-speed TDM networks", IEEE Photonics Technology Letters, p. 1277-1279, v. 9, no. 9, September 1997.

The field response h(t) is approximately proportional to the square root of the intensity response, I(t). The approximation is very accurate when the pulsed waveform described by h(t) is near transform limited (which means the Fourier Transform of the field impulse response is approximately equal to the measured spectrum of the waveform). This implies that the phase of h(t) varies slowly with time, (slow compared to the width of the pulse being measured, i.e., the pulse in not chirped). For more a more detailed description of chirp, see F. Koyam and K. Iga, "Frequency Chirping in External Modulators", IEEE Journal of Lightwave Technology, v. 6, no. 1, January 1988.

While filter matching is achieved by the field relationship, $H_{sig}(f)=H^*_{rec}(f)$, which corresponds to $h_{sig}(t)=h_{rec}(t)$ for symmetric waveforms, this relationship converges to $I_{sig}(t)=I_{rec}(t)$ for waveforms with little or no chirp. Here, $h_{sig}(t)$ and $h_{rec}(t)$ represent the signal field waveform and the field receiver impulse response in time, respectively; $H_{sig}(f)$ and $H_{rec}(f)$ are the field frequency domain transfer functions for the signal waveform and receiver filter, respectively; and $I_{sig}(t)$ and $I_{rec}(t)$ represent the signal intensity waveform and the intensity receiver impulse response in time, respectively. However, even for Gaussian waveforms with substantial chirp, for example a filter impulse response with a measured spectrum that is 60% larger than the expected Fourier Transform of the field impulse response (i.e., not transform limited), the approximation causes less than a 0.5 dB error in the estimate of received SNR (see FIG. 9).

Alternatively, the field response h(t) can be extracted via mathematical means using more complex measurement techniques, such as those described in R. Trebino, et. al., "Measuring ultrashort laser pulses in the time-frequency domain using frequency-resolved optical gating", Rev. Sci. Instrum. 68 (9), September 1997; M. Kuznetsov and D. O. Caplan, "Time-frequency analysis of optical communication signals and the effects of second and third order dispersion", CLEO, May 2000; and U. Wagemann, "Photonic All-parameter Analyzer", product note, Agilent Technologies, 2001, which can measure phase dependent parameters such as group delay and chromatic dispersion.

Continuing to refer to FIG. 15, in step 1520, the process 1500 determines whether the amount of resolution provided by the ~40+ GHz oscilloscope or ~100+ GHz cross-correlator is adequate. If so, then the process 1500 continues to step 1540. In step 1540, the process 1500 prescribes matching a transmitter waveform in the time domain to the impulse response, $h_s(t)$, of the optical receiver filter 340 in the time domain.

If more resolution is determined necessary in step 1520, then the process 1500 prescribes applying the same impulse to the detection system that was applied to the candidate optical receiver filter 340 to measure the impulse response, $h_d(t)$, of the detection system. This is the first step 1530 of the deconvolution process 1525. In the second step 1535 of the deconvolution process 1525, the deconvolution process 1525 prescribes calculating a net measured response of the optical receiver filter 340 using the following formulas:

time domain: $h_m(t)=h_d(t)*h_s(t)$ frequency domain: $H_m(f)=H_d(f)H_s(f)$, where $H_i(f)=FT[h_i(t)]$.

Thus, $h_s(t)=\text{IFT}[H_m(f)/H_d(f)]=\text{IFT}[(FT[h_m(t)])/(FT[h_d(t)])]$, where IFT is the Inverse Fourier Transform operation. Note that the ~40+ GHz bandwidth achieved by the measurement system of step 1515 can be extended to ~75+ GHz bandwidth using the same detection system and the deconvolution of steps 1530 and 1535. In the case of the ~100+ GHz bandwidth achieved by the cross-correlator of step 1517, the ~100+ GHz bandwidth can be extended to ~200+ GHz bandwidth using the same detection system and deconvolution of steps 1530 and 1535.

The process 1525 continues to step 1540 for matching the transmitter waveform and the time domain of the impulse response, $h_s(t)$, of the optical filter in the time domain. The process 1500 ends in step 1545.

While this invention has been particularly shown and described with references to preferred embodiments thereof, it will be understood by those skilled in the art that various changes in form and details may be made therein without departing from the scope of the invention encompassed by the appended claims. For example, the teachings discussed herein could be applicable to RF or electrical domain communications.

What is claimed is:

1. An optical receiver, comprising:
   an optical filter having a substantially Gaussian time domain optical impulse response essentially equivalent to a time domain waveform of a received optical signal to be filtered.

2. The optical receiver as claimed in claim 1 further including detection electronics optically coupled to the optical filter to convert the optical signal to a corresponding electrical signal.

3. The optical receiver as claimed in claim 1 further including an optical preamplifier configured to receive the optical signal and to provide an amplified optical signal to the optical filter.

4. The optical receiver as claimed in claim 3 wherein the optical preamplifier is further configured to provide average-power-limited operation.

5. The optical receiver as claimed in claim 3 wherein the optical preamplifier is an erbium-doped fiber amplifier.

6. The optical receiver as claimed in claim 1 wherein the optical signal is composed of essentially Gaussian pulses.

7. The optical receiver as claimed in claim 6 wherein the pulses are return-to-zero pulses.

8. The optical receiver as claimed in claim 1 wherein the optical filter is configured to have the time domain impulse response essentially equivalent to the time domain waveform of the received optical signal based upon a measurement of the optical signal directly in the time domain.

9. The optical receiver as claimed in claim 8 wherein the optical filter time domain impulse response is configured to be essentially equivalent to the time domain waveform of the received optical signal based upon a measurement using a deconvolution technique to remove measurement system impulse response related effects.

10. The optical receiver as claimed in claim 1 wherein the optical filter time domain impulse response is configured to be essentially equivalent to the time domain waveform of the received optical signal based upon a measurement using a cross-correlation technique to increase measurement resolution.

11. The optical receiver as claimed in claim 10 wherein the optical filter time domain impulse response is configured to be essentially equivalent to the time domain waveform of the received optical signal based upon a measurement using a deconvolution technique to remove measurement system impulse response related effects.

12. A method for receiving an optical signal, comprising:
   providing an optical filter having a substantially Gaussian time domain optical impulse response essentially equivalent to a time domain waveform of an optical signal; and
   filtering the optical signal.

13. The method as claimed in claim 12 further including converting the optical signal to a corresponding electrical signal.

14. The method as claimed in claim 12 further including optically preamplifying the optical signal.

15. The method as claimed in claim 14 wherein optically preamplifying the optical signal provides average-power limited operation.

16. The method as claimed in claim 14 wherein optically preamplifying the optical signal includes using an erbium-doped fiber amplifier.

17. The method as claimed in claim 12 wherein the optical signal is composed of essentially Gaussian-like pulses.

18. The method as claimed in claim 17 wherein the pulses are return-to-zero pulses.

19. The method as claimed in claim 12 further including measuring the optical signal directly in the time domain.

20. The method as claimed in claim 19 wherein the optical filter time domain impulse response is measured using a deconvolution technique to remove measurement system impulse response related effects.

21. The method as claimed in claim 12 wherein the optical filter time domain impulse response is measured using a cross-correlation technique to increase measurement resolution.

22. The method as claimed in claim 21 wherein the optical filter time domain impulse response is measured using a deconvolution technique to remove measurement system impulse response related effects.

23. An optical receiver, comprising:
   means for receiving an optical signal; and
   means for optically filtering the optical signal, said means having a substantially Gaussian time domain optical impulse response essentially equivalent to a time domain waveform of the optical signal.

24. The optical receiver as claimed in claim 23 further including means for converting the optical signal to a corresponding electrical signal.

25. A method for assembling an optical receiver, comprising:
   selecting an optical filter having a time domain optical impulse response essentially equivalent to a time domain waveform of an optical signal to be filtered; and coupling the optical filter to detection electronics used to convert the optical signal to a corresponding electrical signal.

* * * * *

UNITED STATES PATENT AND TRADEMARK OFFICE
CERTIFICATE OF CORRECTION

| | | |
|---|---|---|
| PATENT NO. | : 8,958,666 B2 | Page 1 of 1 |
| APPLICATION NO. | : 11/649337 | |
| DATED | : February 17, 2015 | |
| INVENTOR(S) | : Caplan et al. | |

It is certified that error appears in the above-identified patent and that said Letters Patent is hereby corrected as shown below:

In the Specification

Please delete the paragraph titled "GOVERNMENT SUPPORT" encompassing Column 1, lines 12-17:

"The invention was supported, in whole or in part, by a grant F19628-00-C-002 from United States Air Force. The Government has certain rights in the invention."

and replace with:

"This invention was made with Government support under Contract No. F19628-00-C-0002 awarded by the Air Force. The Government has certain rights in the invention."

Signed and Sealed this
Twenty-ninth Day of March, 2016

Michelle K. Lee
*Director of the United States Patent and Trademark Office*